US012609902B1

(12) United States Patent
Chase et al.

(10) Patent No.: US 12,609,902 B1
(45) Date of Patent: Apr. 21, 2026

(54) PRE-PROCESSING CACHE FOR A RESOURCE ALLOCATION ANALYSIS SERVER

(71) Applicant: SAP SE, Walldorf (DE)

(72) Inventors: Christopher Chase, Palo Alto, CA (US); Bang Zhao, Shanghai (CN); Zhiguo Qu, Shanghai (CN); Juncai Zhang, Shanghai (CN); Sheng Chu, Shanghai (DE)

(73) Assignee: SAP SE, Walldorf (DE)

( * ) Notice: Subject to any disclaimer, the term of this patent is extended or adjusted under 35 U.S.C. 154(b) by 51 days.

(21) Appl. No.: 18/918,739

(22) Filed: Oct. 17, 2024

(51) Int. Cl.
*H04L 47/70* (2022.01)
*H04L 41/14* (2022.01)

(52) U.S. Cl.
CPC ............ *H04L 47/822* (2013.01); *H04L 41/14* (2013.01)

(58) Field of Classification Search
CPC ............................. H04L 47/822; H04L 41/14
See application file for complete search history.

(56) References Cited

U.S. PATENT DOCUMENTS 6,980,985 B1 * 12/2005 Amer-Yahia ....... G06F 16/2471
707/999.009
7,580,938 B1 * 8/2009 Pai ........................ G06F 3/0482
8,249,885 B2 * 8/2012 Berkowitz ......... G06Q 30/0625
705/1.1

| 9,946,653 | B2 * | 4/2018 | Yamamoto | .......... G06F 12/0866 |
| 10,997,641 | B1 * | 5/2021 | Harris | .................... G06F 16/953 |
| 11,132,415 | B1 * | 9/2021 | Gentilello | ........... G06F 16/9566 |
| 2005/0050471 | A1 * | 3/2005 | Hallisey | .............. G06F 3/04817 |
| | | | | 715/713 |
| 2006/0085440 | A1 * | 4/2006 | Jandhyala | ................ G06F 16/10 |
| 2007/0250487 | A1 * | 10/2007 | Reuther | ................. G06F 16/35 |
| 2009/0064159 | A1 * | 3/2009 | LaFrese | ................ G06F 3/0686 |
| | | | | 718/104 |
| 2009/0138471 | A1 * | 5/2009 | Zhang | ..................... H04L 69/18 |
| 2009/0313562 | A1 * | 12/2009 | Appleyard | .......... H04L 41/0253 |
| | | | | 715/764 |
| 2011/0137747 | A1 * | 6/2011 | Sapin Bodeman | ......................... |
| | | | | G06Q 30/0611 |
| | | | | 705/26.4 |

(Continued)

*Primary Examiner* — Muhammad Raza
(74) *Attorney, Agent, or Firm* — Buckley, Maschoff & Talwalkar LLC

(57) ABSTRACT

A resource allocation network data store data store contains information about a plurality of resource allocations. Each allocation is associated with a multi-level hierarchical resource identifier. A pre-processing cache periodically retrieves information from the resource allocation network data store, pre-aggregates the information for multiple combinations of selectable analysis options, and stores the pre-aggregated data. An analysis server receives an analysis initiation request (including a plurality of selected analysis options) from a network point. The server then determines a first value of resource amounts based on the selected analysis options, information in the cache, and allocation amounts for the network point initiating the analysis. The server also determines a second value of resource amounts based on allocation amounts for points including points other than the point initiating the analysis. A response, including the first and second values, is provided to the network point that provided the analysis initiation request.

17 Claims, 27 Drawing Sheets

(56)     References Cited

U.S. PATENT DOCUMENTS

| | | | |
|---|---|---|---|
| 2011/0218874 A1* | 9/2011 | Pulnikova | G06Q 30/08 |
| | | | 705/27.1 |
| 2012/0296780 A1* | 11/2012 | McEntire | G06Q 30/0277 |
| | | | 705/26.1 |
| 2014/0372280 A1* | 12/2014 | Pulnikova | G06Q 30/08 |
| | | | 705/37 |
| 2016/0171590 A1* | 6/2016 | Kolb | G06Q 30/0631 |
| | | | 705/26.7 |
| 2016/0373476 A1* | 12/2016 | Dell'Anno | G06F 21/552 |
| 2017/0102678 A1* | 4/2017 | Nixon | G05B 17/02 |
| 2017/0103103 A1* | 4/2017 | Nixon | G06F 16/2452 |
| 2017/0315917 A1* | 11/2017 | Yamamoto | G06F 12/0862 |
| 2017/0344623 A1* | 11/2017 | Hu | G06F 16/907 |
| 2019/0272471 A1* | 9/2019 | Jain | G06F 8/60 |
| 2020/0065012 A1* | 2/2020 | Breslow | G06F 3/0604 |
| 2020/0167869 A1* | 5/2020 | Magdelinic | G06F 18/214 |
| 2020/0401528 A1* | 12/2020 | Sharma | G06F 3/0608 |
| 2021/0056434 A1* | 2/2021 | Raghunathan | G06N 20/20 |
| 2021/0342919 A1* | 11/2021 | Conquet | G06F 21/31 |
| 2022/0197796 A1* | 6/2022 | Rumanek | G06F 16/215 |
| 2023/0351327 A1* | 11/2023 | Ratnapu | G06Q 10/0875 |
| 2024/0212001 A1* | 6/2024 | Jones | G06Q 30/0275 |
| 2024/0394251 A1* | 11/2024 | Brende | G06F 16/24522 |
| 2025/0190437 A1* | 6/2025 | Hope | G06F 16/2455 |
| 2025/0217736 A1* | 7/2025 | Corwin | G06Q 10/06314 |
| 2025/0293884 A1* | 9/2025 | Gilchrist | H04L 9/3213 |

* cited by examiner

100

140
Enterprise Resource Planning ("ERP") Central Component For Customers

130
Spend Management Software (For Buyers And Sellers)

ENTERPRISE TRANSACTION NETWORK
110

150
Asset Intelligence Network

120
Vendor Management System For Service Providers 160
3rd Party Network Open APIs

200

210

RESOURCE ALLOCATION
NETWORK DATA STORE

250

ANALYSIS SERVER

260

PRE-PROCESSING CACHE

Analysis
Initiation
Request

Response

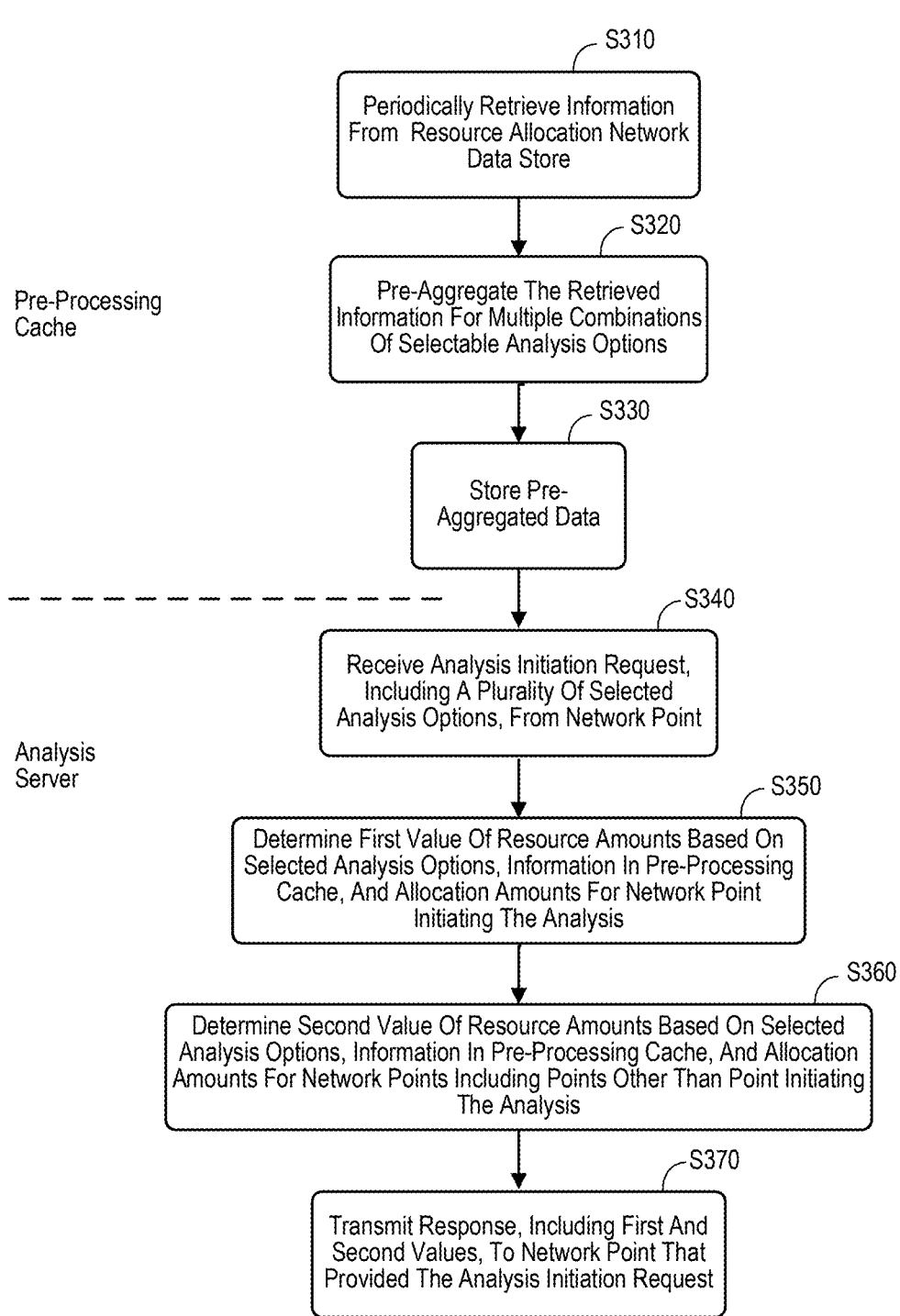

Pre-Processing
Cache

Analysis
Server

S310

Periodically Retrieve Information
From Resource Allocation Network
Data Store

S320

Pre-Aggregate The Retrieved
Information For Multiple Combinations
Of Selectable Analysis Options

S330

Store Pre-
Aggregated Data

S340

Receive Analysis Initiation Request,
Including A Plurality Of Selected
Analysis Options, From Network Point

S350

Determine First Value Of Resource Amounts Based On
Selected Analysis Options, Information In Pre-Processing
Cache, And Allocation Amounts For Network Point
Initiating The Analysis

S360

Determine Second Value Of Resource Amounts Based On Selected
Analysis Options, Information In Pre-Processing Cache, And Allocation
Amounts For Network Points Including Points Other Than Point Initiating
The Analysis

S370

Transmit Response, Including First And
Second Values, To Network Point That
Provided The Analysis Initiation Request

910
Read Data

920
Clean Data

930
Evaluate Description

940
Derive UNSPSC

950
Evaluate UNSPSC

960
Write Data

FILTERS <u>1120</u>       /1122

Segment
    ☒ Chemical Supplie

Family
    ☒ All
    ☒ Furniture
    ☒ Accounting

Class
    ☐ All
    ☒ Abrasive Wheels
    ☐ Additives

*FIG. 11*

| ANALYSIS REQUEST IDENTIFIER 2102 | NETWORK POINT SUBMITTING REQUEST 2104 | SELECTED ANALYSIS OPTIONS 2106 | FIRST VALUE 2108 | SECOND VALUE 2110 | RESPONSE IDENTIFIER 2112 |
|---|---|---|---|---|---|
| R_101 | | | | | |
| R_102 | | | | | |
| R_103 | | | | | |
| R_104 | | | | | |

PRE-PROCESSING CACHE FOR A RESOURCE ALLOCATION ANALYSIS SERVER

BACKGROUND

An enterprise may utilize a transaction network in connection with allocation of resources (e.g., goods and services), such as allocations between resource providers and resource consumers. For example, FIG. 1 is an enterprise environment 100 including an enterprise transaction network 110 connecting people, processes, and systems across multiple enterprises to digitalize transactions and create transparent, resilient, and sustainable resource supply chains. The network 110 may be used to interact with a vendor management system for service providers 120 to manage services procurement and external workforce management programs. Spend management software (e.g., for resource buyers and sellers) 130 may help the enterprise achieve a unified view of enterprise spending to reduce costs, mitigate risks, improve collaboration, etc. An Enterprise Resource Planning ("ERP") central component 140 for customers may incorporate business functions of an organization in one place. An asset intelligent network 150 may provide a common asset data foundation among manufacturers, component suppliers, operators, services providers, etc. to streamline resource order processing. The enterprise transaction network 110 may also exchange information via third party network open Application Programming Interfaces ("APIs") 160.

In a disruptive economy, an enterprise may require early signals of changes in resource demand and markets to remain competitive. For example, suppliers may need to understand what the top items buyers are buying by industry and by region. To help the enterprise, an interactive display may let a user select various analysis options (e.g., a product category). When the resource network is associated with substantial amounts of allocations (e.g., worth trillions of dollars), dynamically computing various values "on-the-fly" in response to a user's selections might not be practical. It would therefore be desirable to provide a pre-processing cache and analysis server in a secure, automatic, and efficient manner.

SUMMARY

According to some embodiments, methods and systems associated with a resource network in a cloud computing environment may include a resource allocation network data store data store contains information about a plurality of resource allocations. Each allocation is associated with a multi-level hierarchical resource identifier. A pre-processing cache periodically retrieves information from the resource allocation network data store, pre-aggregates the information for multiple combinations of selectable analysis options, and stores the pre-aggregated data. An analysis server receives an analysis initiation request (including a plurality of selected analysis options) from a network point. The server then determines a first value of resource amounts based on the selected analysis options, information in the cache, and allocation amounts for the network point initiating the analysis. The server also determines a second value of resource amounts based on allocation amounts for points including points other than the point initiating the analysis. A response, including the first and second values, is provided to the network point that provided the analysis initiation request.

Some embodiments comprise: means for periodically retrieving, by a computer processor of a pre-processing cache, information from a resource allocation network data store that contains information about a plurality of resource allocations, wherein each allocation includes a hierarchical resource identifier, a plurality of network points associated with the allocation, and a resource amount, and the resource identifier hierarchy has a plurality of levels, each level being associated with a plurality of selectable analysis options; means for pre-aggregating, the retrieved information for multiple combinations of selectable analysis options; means for storing the pre-aggregated data; means for receiving, by an analysis server, an analysis initiation request, including a plurality of selected analysis options, from a network point; means for determining a first value of resource amounts based on the selected analysis options, information in the pre-processing cache, and allocation amounts for the network point initiating the analysis; means for determining a second value of resource amounts based on the selected analysis options, information in the pre-processing cache, and allocation amounts for network points including points other than the point initiating the analysis; and means for transmitting a response, including the first and second values, to the network point that provided the analysis initiation request.

Some technical advantages of some embodiments disclosed herein are improved systems and methods to provide a pre-processing cache and analysis server in a secure, automatic, and efficient manner.

BRIEF DESCRIPTION OF THE DRAWINGS

FIG. 3 is a method according to some embodiments.

FIG. 11 illustrates filters in accordance with some embodiments.

FIG. 21 is a portion of an analysis request database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
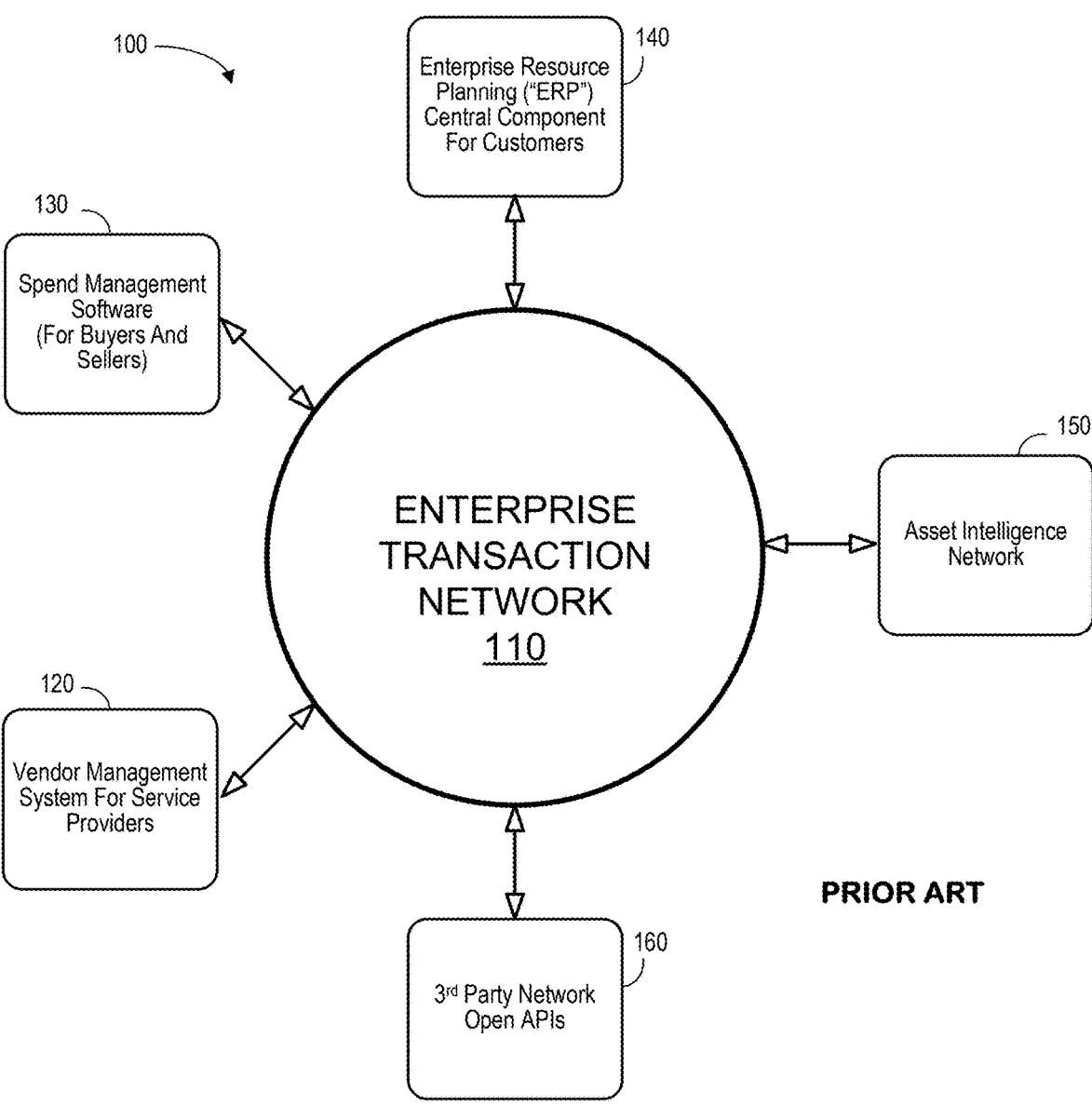
FIG. 1 is an enterprise environment.
Figure 2A:
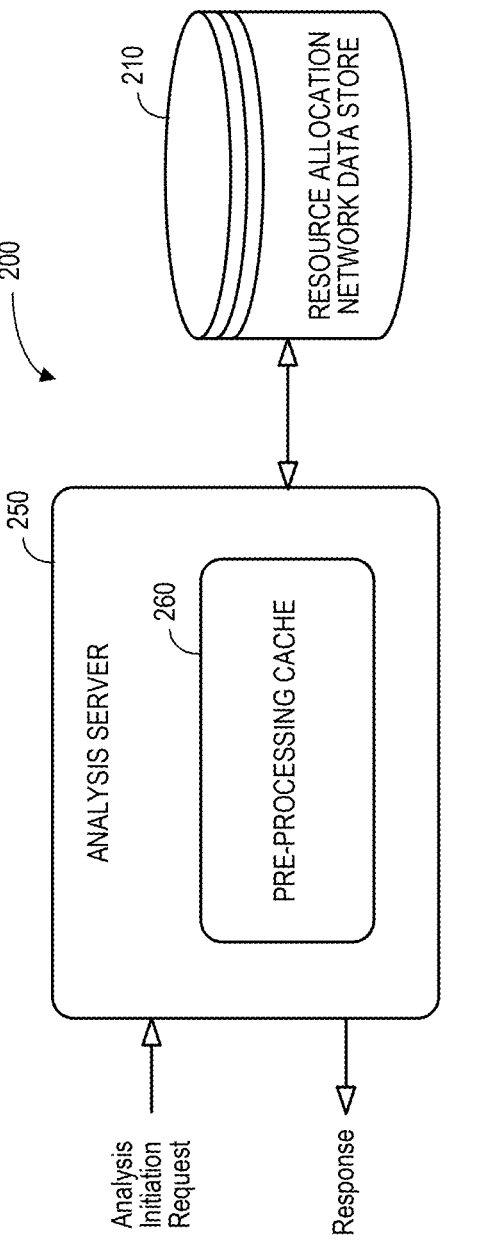
FIG. 2A is a high-level system architecture in accordance with some embodiments.

Some embodiments described herein provide a pre-processing cache and analysis server. For example, FIG. 2A is a high-level block diagram of one example of a system 200 architecture with an analysis server 250 that accesses information about a plurality of resource allocations from a resource allocation network data store 210. The analysis server 250 may then use a pre-processing cache 260 to generate a response to an analysis initiation request. According to some embodiments, a remote operator or administrator device may be used to configure or otherwise adjust the system 200.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LA network, and/or an Internet Protocol ("IP") network such as the Internet, an intranet, or an extranet. Note that any devices described herein may communicate via one or more such communication networks.

Figure 2B:
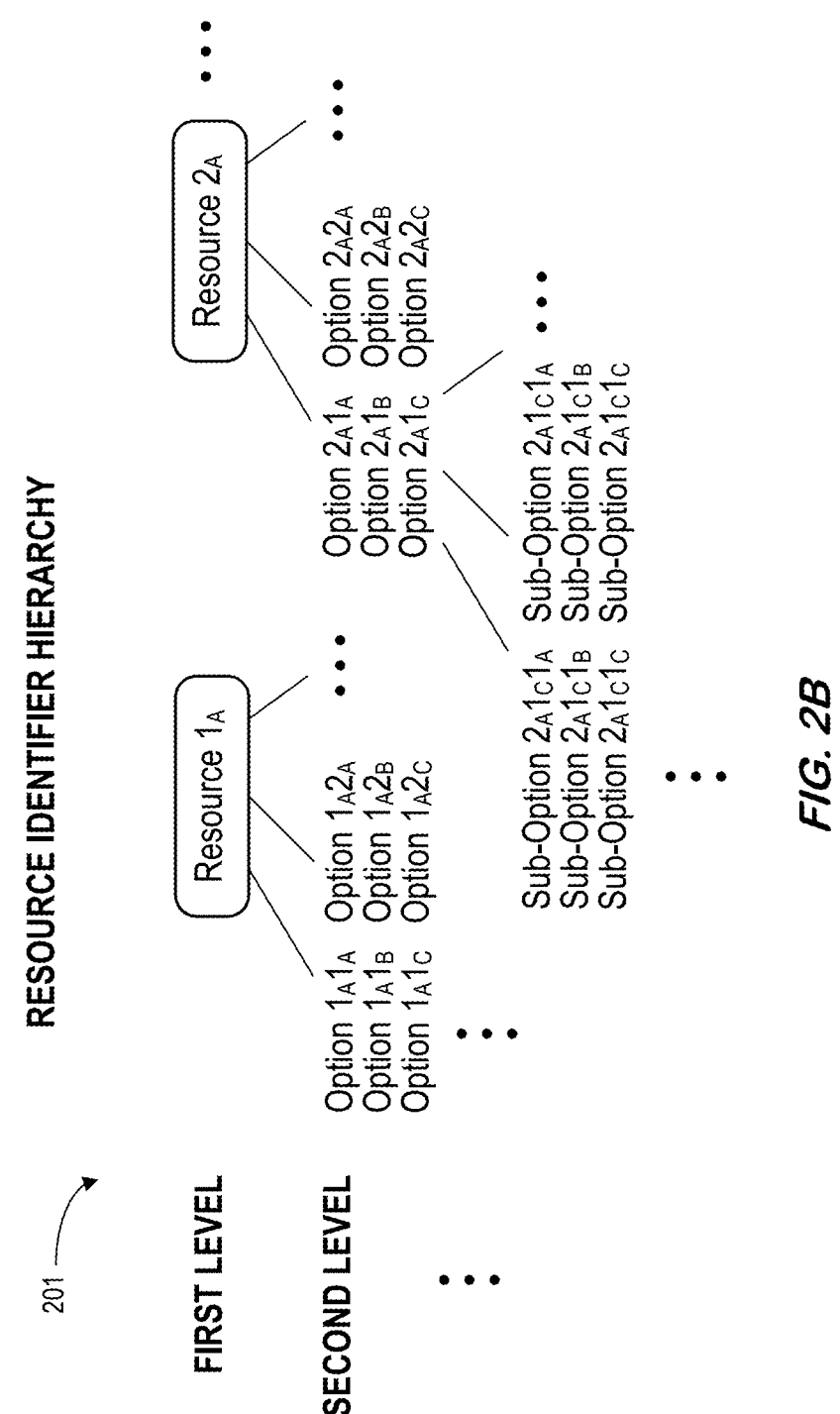
FIG. 2B is a resource identifier hierarchy according to some embodiments.
Figure 2C:
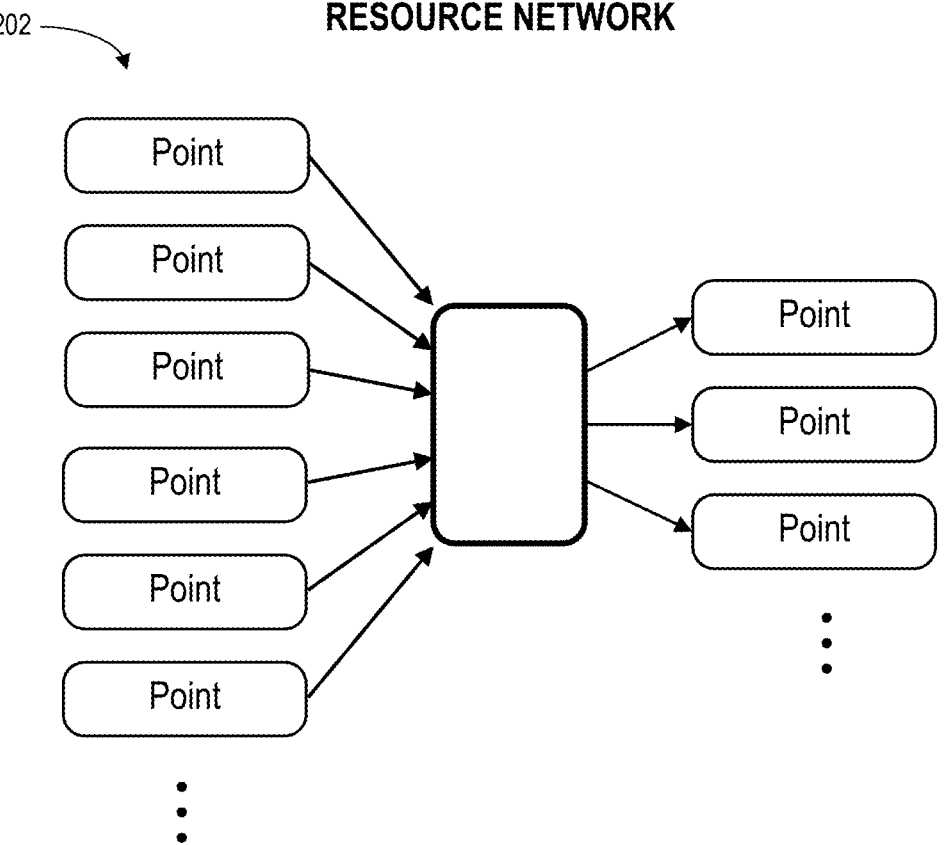
FIG. 2C is a resource network in accordance with the embodiments.

The pre-processing cache 260 stores information about various potential combinations of selected analysis options associated with resource identifiers. For example, FIG. 2B is a multi-level resource identifier hierarchy 201 according to some embodiments. A first level of the hierarchy 201 includes different types of resources $1_A$, $2_B$, etc. Another level of the hierarchy 201 includes various options for each resource, option, etc. That have been allocated in a resource network. For example, FIG. 2C is a resource network 202 in accordance with the embodiments. The network 202 includes a hub through which various network points transfer amounts of resources.

Referring again to FIG. 2A, the analysis server 250 may store information into and/or retrieve information from various data stores (e.g., the resource allocation network data store 210), which may be locally stored or reside remote from the analysis server 250. Although a single analysis server 250 is shown in FIG. 2, any number of such devices may be included. Moreover, various devices described herein might be combined according to embodiments of the present invention. For example, in some embodiments, the resource allocation network data store 210 and the analysis server 250 might comprise a single apparatus. The system 200 functions may be performed by a constellation of networked apparatuses, such as in a distributed processing or cloud-based architecture. In some cases, the analysis server 250 may process information associated with a number of different enterprises.

An enterprise may access the system 200 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify mappings, enrichment logic, etc. for an enterprise computing environment infrastructure) and/or provide or receive automatically generated recommendations, alerts, summaries, or results associated with the system 200.

FIG. 3 is a method that might be performed by some or all of the elements of the system 200 described with respect to FIG. 2A. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a pre-processing cache may periodically retrieve information from a resource allocation network data store (e.g., on a daily or weekly basis). The resource allocation network data store may contain information about a plurality of resource allocations. Each allocation may might include a hierarchical resource identifier, a plurality of network points associated with the allocation, and a resource amount. Moreover, the resource identifier hierarchy may have a plurality of levels, with each level being associated with a plurality of selectable analysis options. At S320, the pre-processing cache may pre-aggregate the retrieved information for multiple combinations of selectable analysis options and store the pre-aggregated data at S330.

At S340, an analysis server may receive, from a network point, an analysis initiation request that includes a plurality of selected analysis options. At S350, an analysis server determines a first value of resource amounts based on the selected analysis options, information in the pre-processing cache, and allocation amounts for the network point initiating the analysis (e.g., by calculating or otherwise determining the first value). Similarly, at S360 a second value of resource amounts is determined based on the selected analysis options, information in the pre-processing cache, and allocation amounts for network points including points other than the point initiating the analysis. At S370, the analysis server transmits a response, including the first and second values, to the network point that provided the analysis initiation request.

According to some embodiments, the analysis server also determines if an anonymous display rule is satisfied for a level of the resource identifier hierarchy. Such an approach may, for example, help prevent parties to the resource network having too many details about their business displayed in the analysis (e.g., when a relatively small number of parties supply and/or purchase a certain product). If the anonymous display rule is not satisfied, the system may automatically cascade information to a higher level in the hierarchy. The anonymous display rule might be, for example, associated with a number of network points for the selected analysis options, a network point's percentage of aggregated resource amounts for the selected analysis options, etc.

In some embodiments, the analysis server automatically enriches resource identifiers using a machine learning model (e.g., by adding or correcting a product code). The machine learning model may be trained with tokenized features, encoded labels, and a Conventional Neural Network ("CNN"). The analysis server might also automatically evaluate a quality of the enriched resource identifiers (and discard low quality enrichments).

Figure 4A:
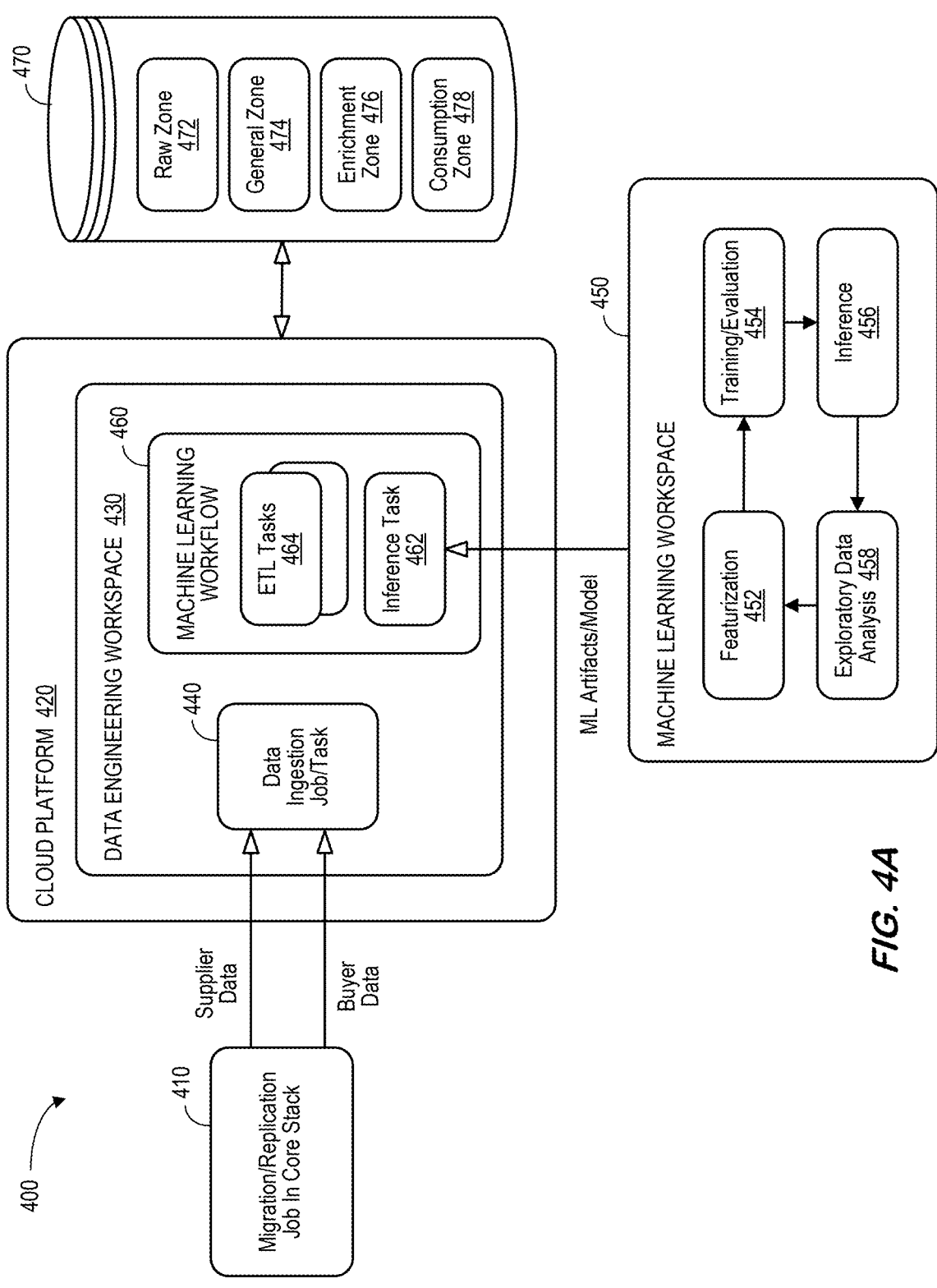
FIG. 4A is a design overview in accordance with some embodiments.
Figure 4B:
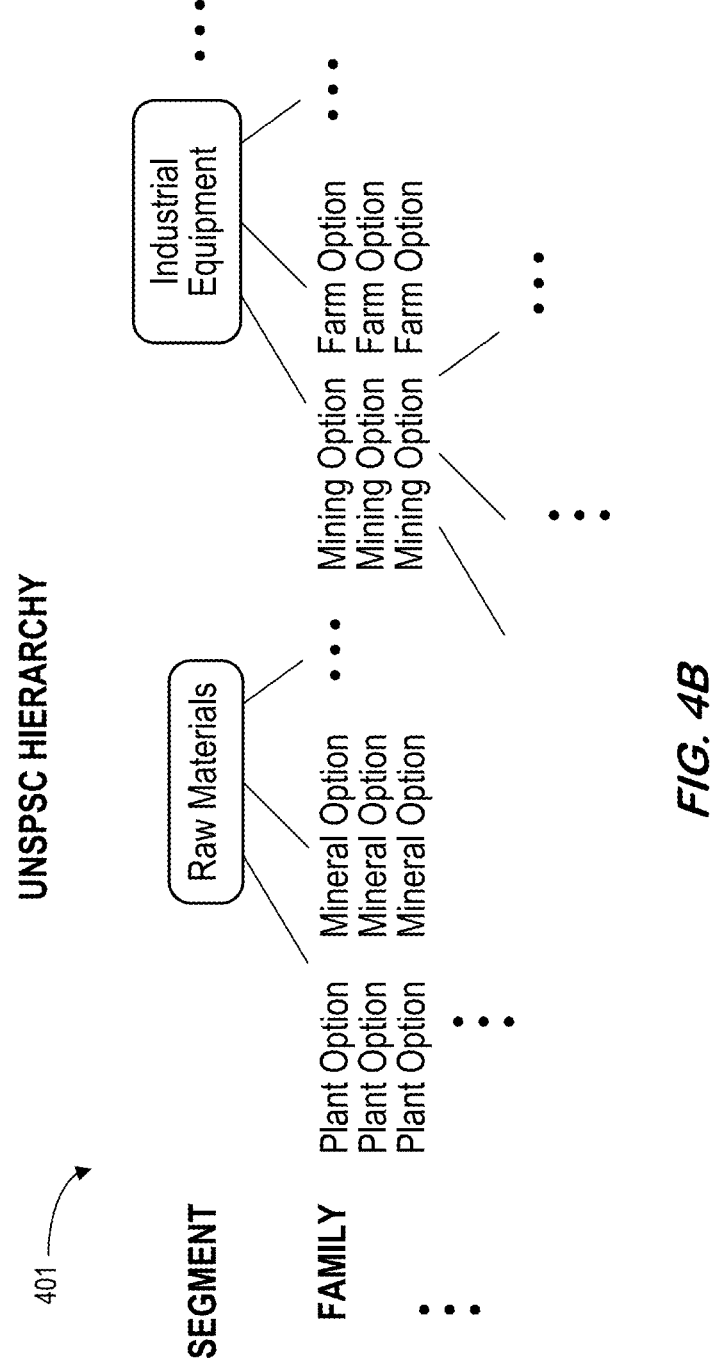
FIG. 4B is a UNSPSC hierarchy according to some embodiments.
Figure 4C:
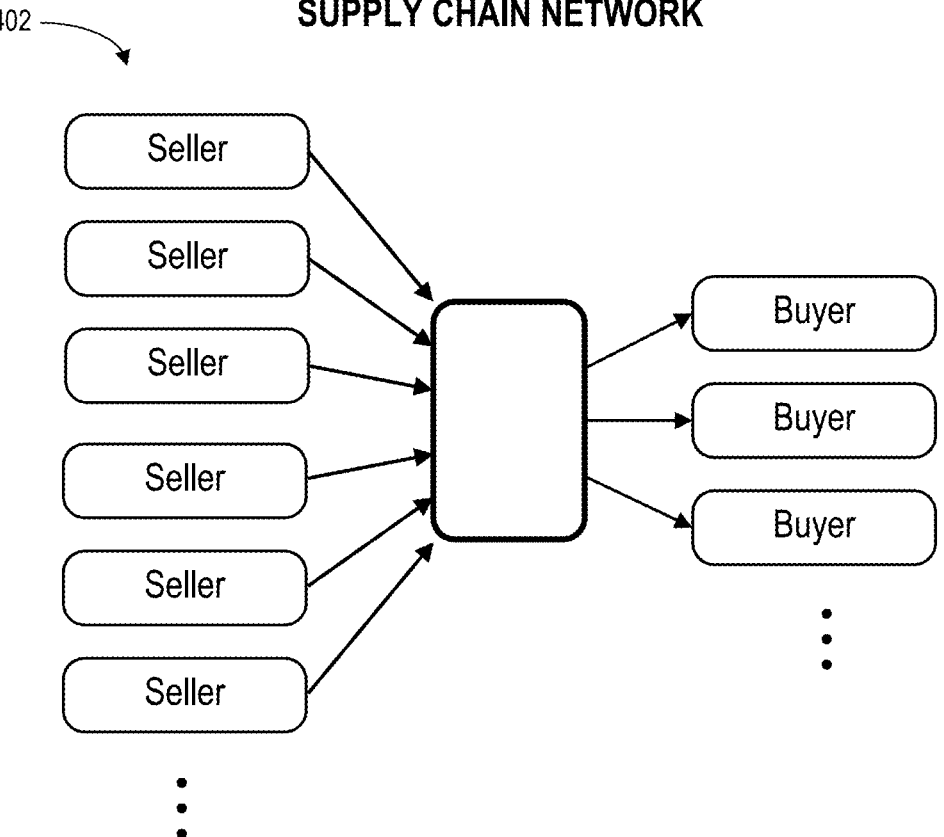
FIG. 4C is a supply chain network in accordance with the embodiments.

FIG. 4A is a design system 400 overview in accordance with some embodiments. A migration/replication job in a core stack 410 provides supplier and buyer data to a data ingestion job/task 440 in a data engineering space 430 of a cloud platform 420. The supplier and/or buyer data may include United Nations Standard Products and Services Code ("UNSPSC") information. For example, FIG. 4B is a UNSPSC hierarchy 401 according to some embodiments. The UNSPSC hierarchy 401 is an open, global, multi-sector standard for classification of products and services. The UNSPSC hierarchy 401 provides a global classification system that can be used for enterprise visibility of spend analysis, cost-effective procurement optimization, exploitation of electronic commerce capabilities, etc. The UNSPSC hierarchy 401 encompasses a five-level hierarchical classification code (e.g., with a first level that includes raw materials, industrial equipment, etc.). Embodiments may let a user drill down or up within the code to see more or less detail for business analysis. The hierarchy 401 may be associated with a supply chain network 402 for buyers and sellers as shown in FIG. 4C.

According to some embodiments, a machine learning model identifies codes based on purchase orders, descriptions, etc. Substantial amounts of purchase orders labeled with proper categories can be used to train the machine learning model, and then the model can be used to infer categories of other purchase orders. The categories can help customers better analyze and predict the future trend of specific business domains. Referring again to FIG. 4A, a machine learning workspace 450 may perform featurization 452. The features may be provided to machine learning training/evaluation 454 and inference 456. Finally, exploratory data analysis 458 to create machine learning artifacts/ models provided to an inference task 462 of a machine learning workflow 460. Extract, Transform, Load ("ETL") tasks 464 extract data from an input source, transform the data, and load the transformed data into an output data container (e.g., by sending a table schema to a storage device 470 that includes a raw zone 472, a general zone 474, an enrichment zone 476, and a consumption zone 478).

Figure 5:
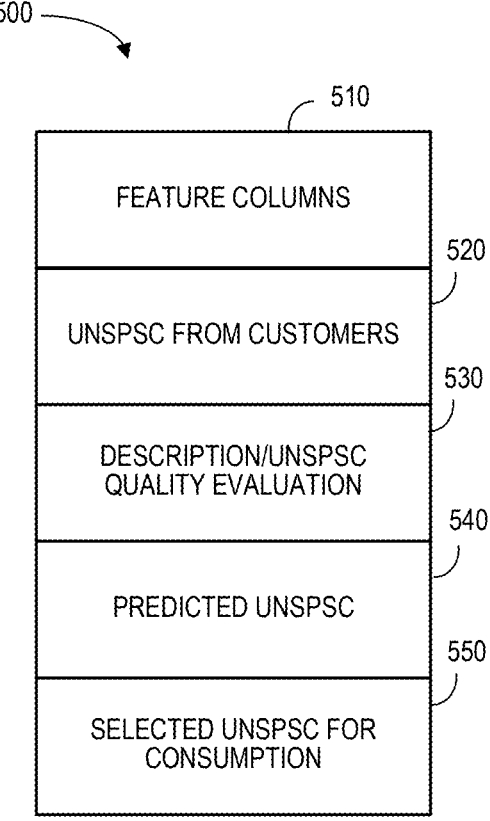
FIG. 5 is a table schema according to some embodiments.

FIG. 5 is one example of a table schema 500 according to some embodiments. The schema 500 includes feature columns 510 that might include, for example, a purchase order number, a buyer identifier, a supplier identifier, a product description, etc. The schema 500 may also include UNSPSC information provided directly from customers 520, such as a segment, family, class, commodity, etc. Description/UNSPSC quality evaluation 530 values, the automatically predicted UNSPSC 540 (e.g., by a machine learning model), and the selected UNSPSC for consumption 550 are also included in the schema 500.

Figure 6:
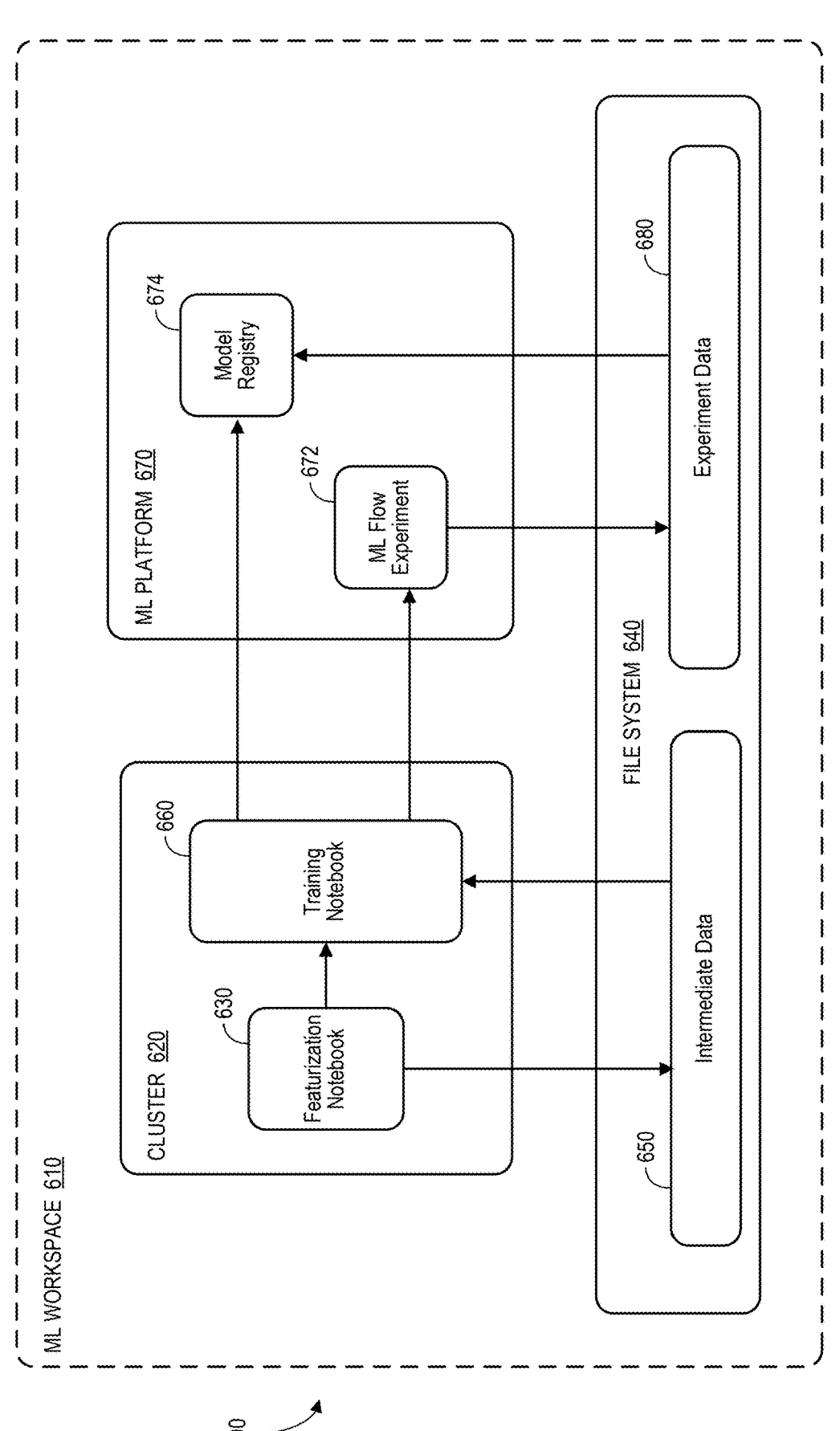
FIG. 6 is a training process system in accordance with some embodiments.

FIG. 6 is a training process system 600 that can be used to create a machine learning model in accordance with some embodiments. The system 600 includes a workspace 610 running a cluster 620. A featurization notebook 630 in the cluster 620 may load training data, load a UNSPSC list from a commodity table, filter out training data with invalid UNSPSC codes (e.g., an incorrect length, not found in the commodity table, etc.), split the UNSPSC code in the training data to four levels, drop or correct (e.g., via replace or fill) training data that has invalid features, and persist training data features into intermediate data 650 in a file system 640.

The intermediate data 650 may be used by a training notebook 660 in the cluster 620. The training notebook 660 may load configuration information data, load training data from the intermediate data 650 in the file system 640, concatenate feature columns, sample training data if needed, encode the UNSPSC label, tokenize features and padding, split training data to training and evaluation sets, build a Convolutional Neural Network ("CNN") model, evaluate the model, calculate precision, and register the model. The training notebook 660 automatically records parameters and data during training and provides the information to a machine learning flow experiment 672 in a machine learning platform 670 that creates experiment data 680 in the file system 640. The experiment data 680 may be used to update a model registry 674 that is accessible by other systems.

Figure 7:
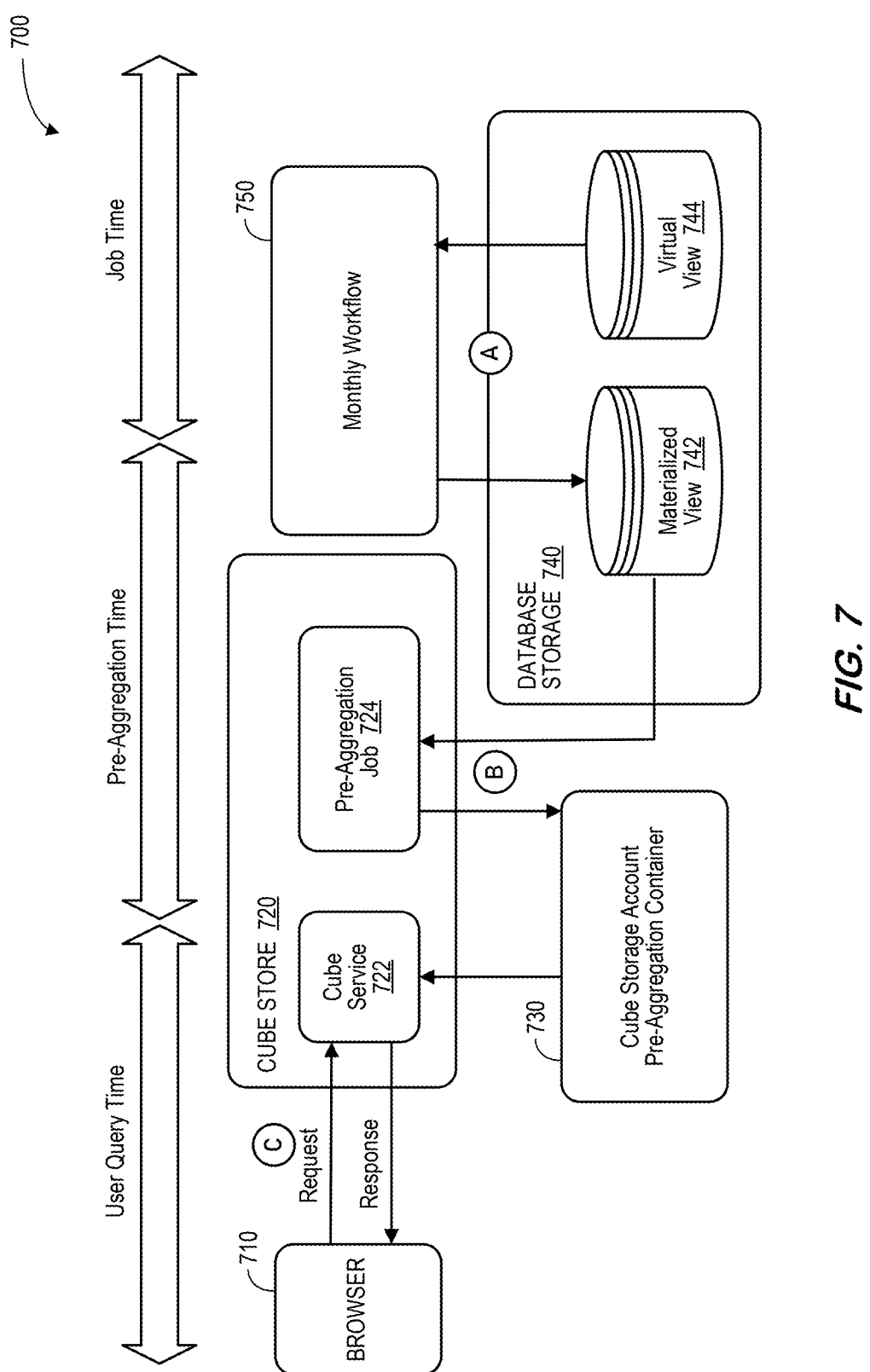
FIG. 7 is a data analytics architecture overview according to some embodiments.

A data analytics platform may leverage pre-aggregated data and materialized views to enhance real-time data access and performance for end-users and achieve efficient data processing and retrieval. For example, FIG. 7 is a data analytics architecture 700 overview according to some embodiments. The architecture 700 may be associated with a user query time, a pre-aggregation time, and a job time. At (A), a periodic (e.g., daily, monthly, weekly, etc.) workflow 750 accesses a predefined virtual view 744 in database storage 740. The workflow 750 may then store the actual delta tables into a materialized view 742 in the database storage 740. At (B), a pre-aggregation job 724 at a cube store 720 reads the materialized view 742 and writes pre-aggregated data into dedicated cube storage account pre-aggregation container 730 parquet files. At (C), a cube service 722 running in the cube store 720 receives a user request from a browser 710 (e.g., a front-end interface). The cube service 722 directly accesses the pre-aggregated parquet files and returns the requested data to the user via the browser 710. This architecture 700 may significantly improve the performance of real-time user data access by leveraging pre-aggregated data.

7

8

Figure 8:
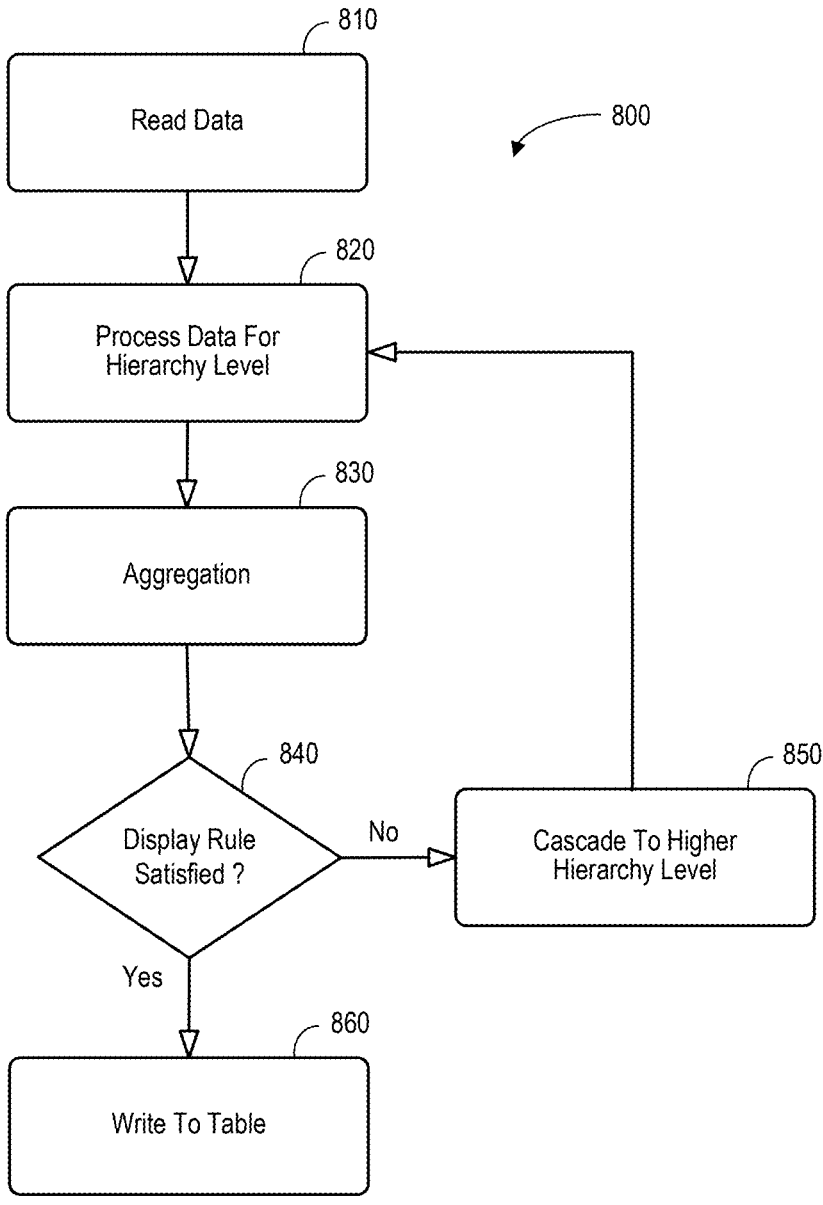
FIG. 8 is an anonymization workflow in accordance with some embodiments.

Some embodiments ensure that available information is associated with an appropriate degree of anonymity. For example, if a particular market has a relatively small number of parties, a user may be able to determine relevant information about other parties. Similarly, a competitor who controls a substantial share of a market (e.g., 80%) might not want other competitors to be able to figure out pricing information, demand information, etc. FIG. 8 is an anonymization workflow 800 in accordance with some embodiments. Initially, the system reads data 810 and processes the data for a hierarchy level 820. Aggregation is then performed 830 (e.g., for that level of the hierarchy).

If a display rule is satisfied at 840, it is written to table 860 for real time access by users. The display rule might indicate, for example, that all of the following three conditions must be met: (1) there are at least seven buyers in the market, (2) there are at least seven sellers in the market, and (3) no one supplier supplies more than fifty percent of the demand. If the display rule is not satisfied at 840, the system cascades to a higher level in the hierarchy 850 and the workflow continues at 820 (e.g., by processing data after combining several different markets in order to protect anonymity).

Figure 9:
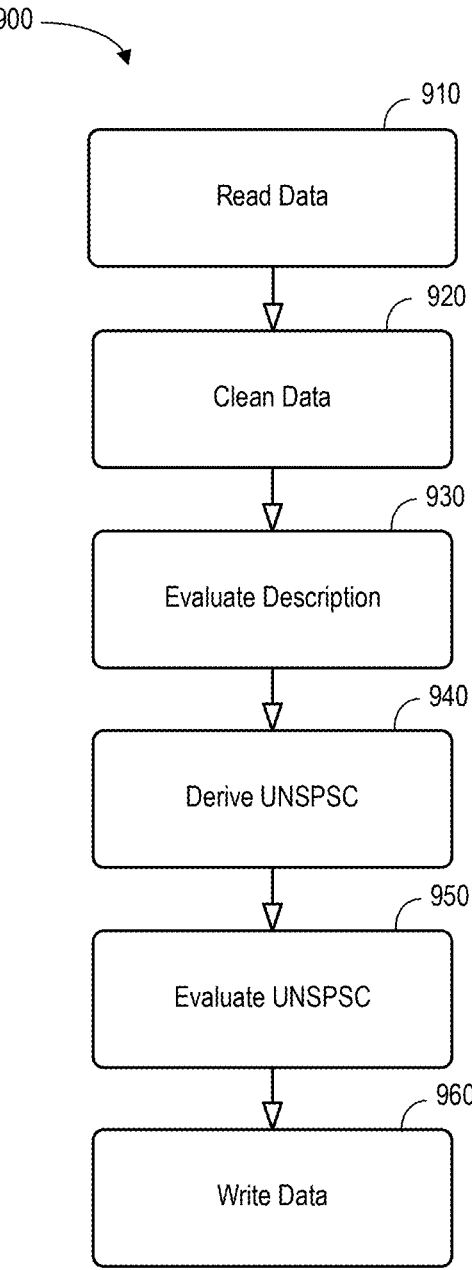
FIG. 9 is a data evaluation workflow according to some embodiments.

FIG. 9 is a data evaluation workflow 900 according to some embodiments. Initially, the system reads data 910 (e.g., derived from purchase orders) and then cleans it 920. A description is evaluated 930 and a UNSPSC is automatically predicted or derived 940 (e.g., using a machine learning model). That UNSPSC is evaluated 950 and, if the data has sufficient accuracy, it is written 960 for use by the system. For example, the data might be used if it is determined to be 70% accurate (otherwise the information is discarded and/or recalculated).

Figure 10:
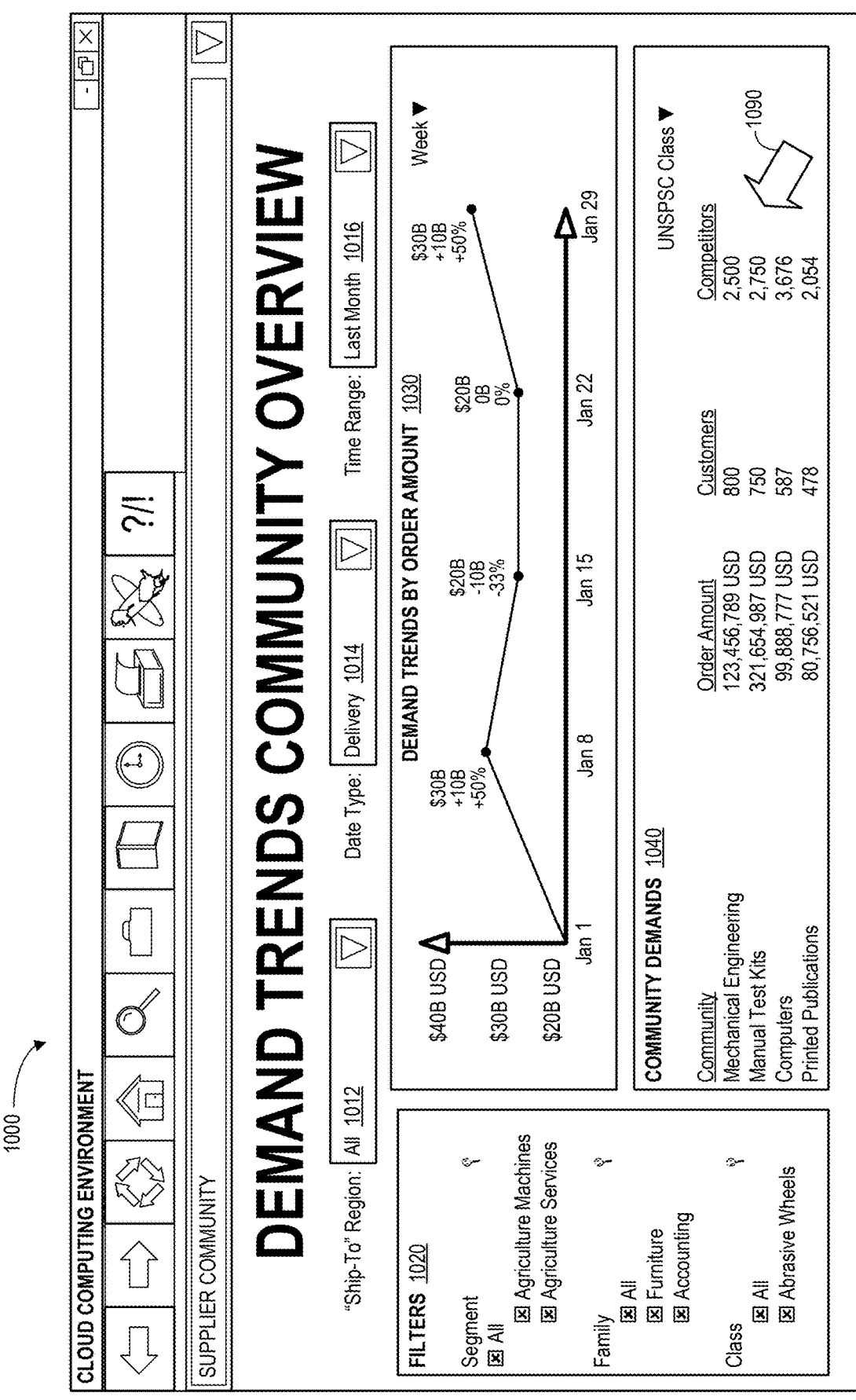
FIG. 10 is a demand trends community overview display according to some embodiments.

FIG. 10 is a demand trends community overview display 1000 according to some embodiments. The display 1000 may, for example, reveal previously hidden behavior of customers so that suppliers can identify trends and opportunities using a machine learning-driven commodity enrichment process. Suppliers may also graphically compare their demand to that of the community in a table. A "ship-to" region or country 1012 may have a user selectable dropdown menu (e.g., via a computer pointer 1090) that determines the data that will be used to drive the display 1000 (e.g., sales originating in the European Union). This may let a supplier search for new opportunities by country or region. Similarly, a date type 1014 (e.g., purchase order dates, delivery dates, etc.) and a time range 1016 (e.g., the last month, the last year, etc.) may be provided. Filters 1020 may let the user specify various products or services that will drive the display 1000 (e.g., UNSPSC segments, families, classes, etc.). Demand trends by order amount 1030 may provide a graphical display of the selected information over a period of time. This may let a supplier evaluate demand (by amount over time to spot trends, unexpected spikes, and seasonality), identify which commodities to pursue for upcoming product launches, identify which commodities to avoid or exit as demand wains, etc. Community demands 1040 may include that information in a tabular formal (e.g., the community name, order amount, a total number of customers, a total number of competitors, etc.).

Figure 12:
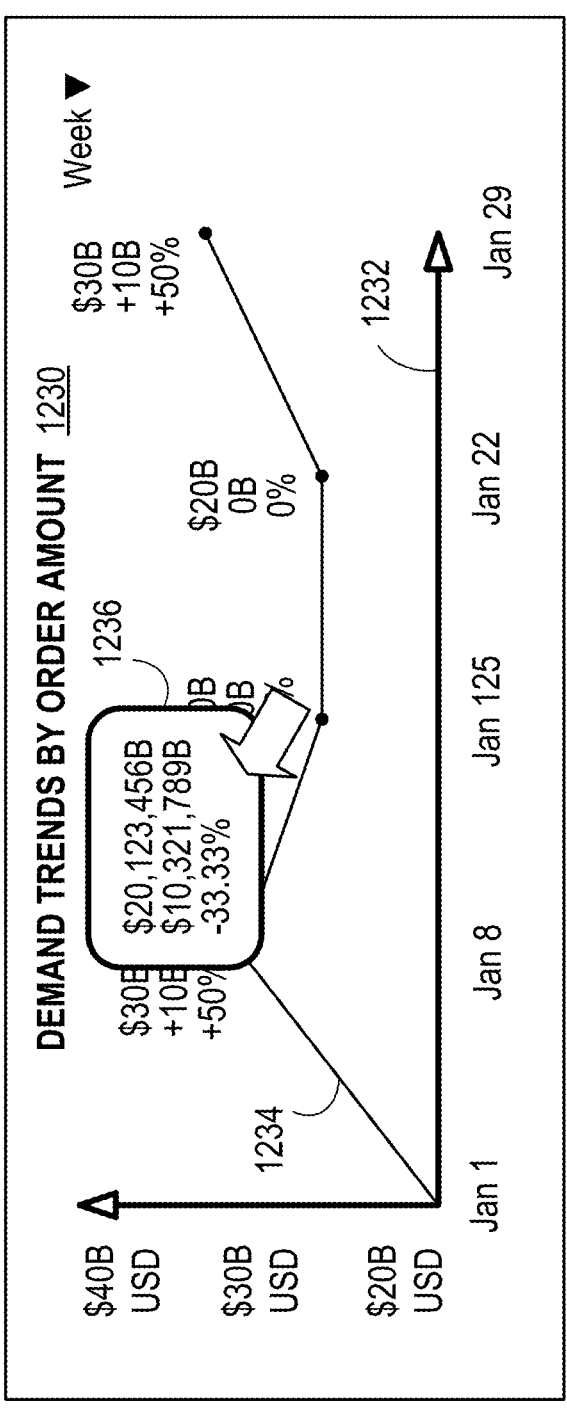
FIG. 12 illustrates demand trend by order amount according to some embodiments.
Figure 13:
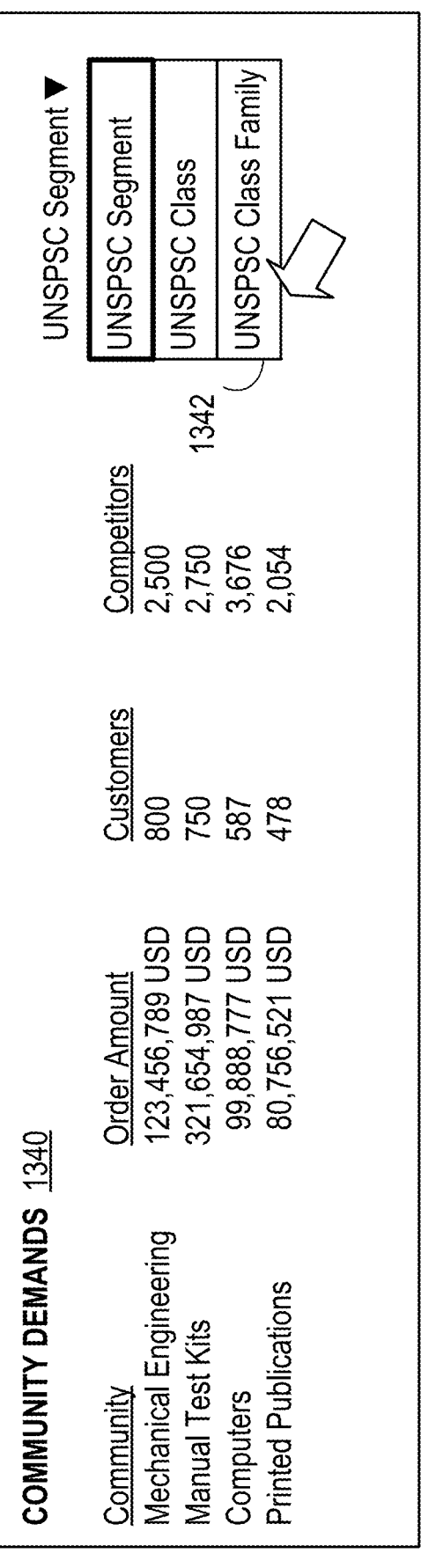
FIG. 13 illustrates community demands in accordance with some embodiments.
Figure 14:
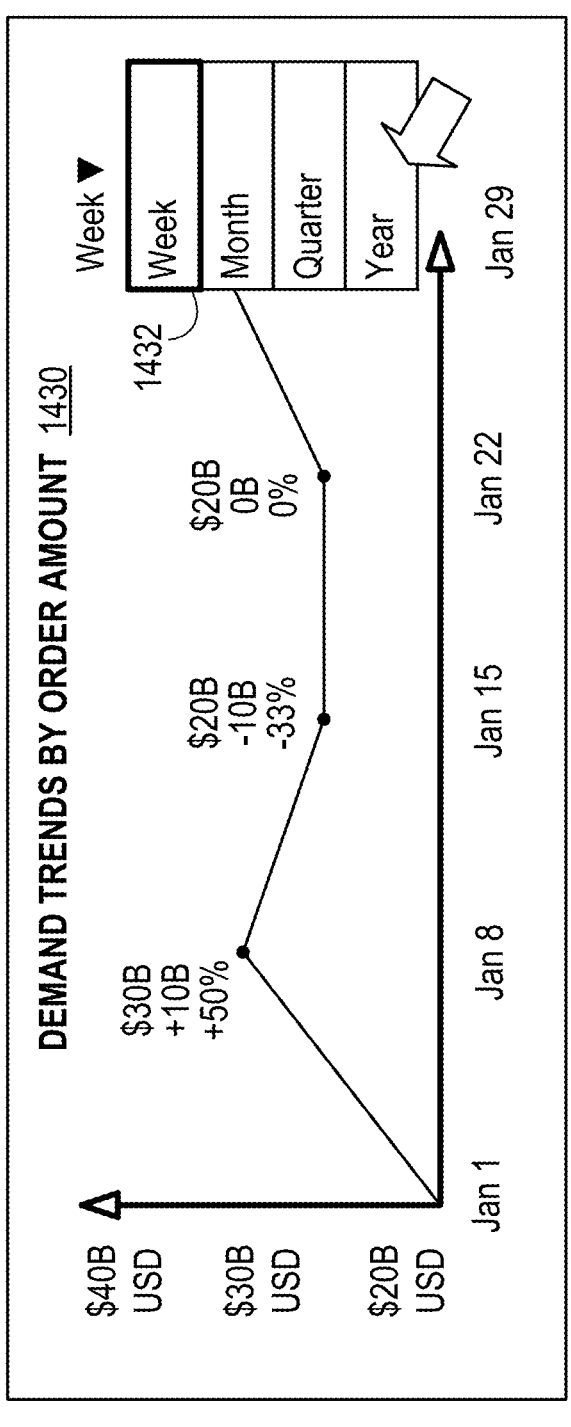
FIG. 14 illustrates demand trend time period selection according to some embodiments.

FIG. 11 illustrates filters 1120 in accordance with some embodiments. The filters 1120 let the user select specific products or services of interest. For example, a search box 1122 may be used to enter text and narrow down various segment, family, class, and commodity lists. FIG. 12 illustrates demand trend by order amount 1230 according to some embodiments. In particular, a graph 1232 may include a line 1234 representing spend amounts at various points in time. Selection of a point on the line 1234 may provide a popup window that lets the user drill down to see more details 1236 about a spend value at that particular time, an absolute change from the prior value, a percentage of change from the prior value, etc. FIG. 13 illustrates community demands 1340 in accordance with some embodiments. In this example, a dropdown menu 1342 may let the user view specific UNSPSC segments, classes, families, etc. to uncover high-demand, low-competition commodities and find products with maximum revenue and profit potential. Note that demand may be evaluated at either a high or low level. Moreover, the table may be sorted by order amount, a number of customers, etc. FIG. 14 illustrates demand trend by order amount 1430 time period selection 1432 according to some embodiments. For example, the selection 1432 may let the user view demand data for a week, a month, a quarter, a year, etc. to evaluate demand in different periods depending on the proximity to today's date. That is, larger buckets (quarter or year) may be selected to analyze demand that occurred further in the past.

Figure 15:
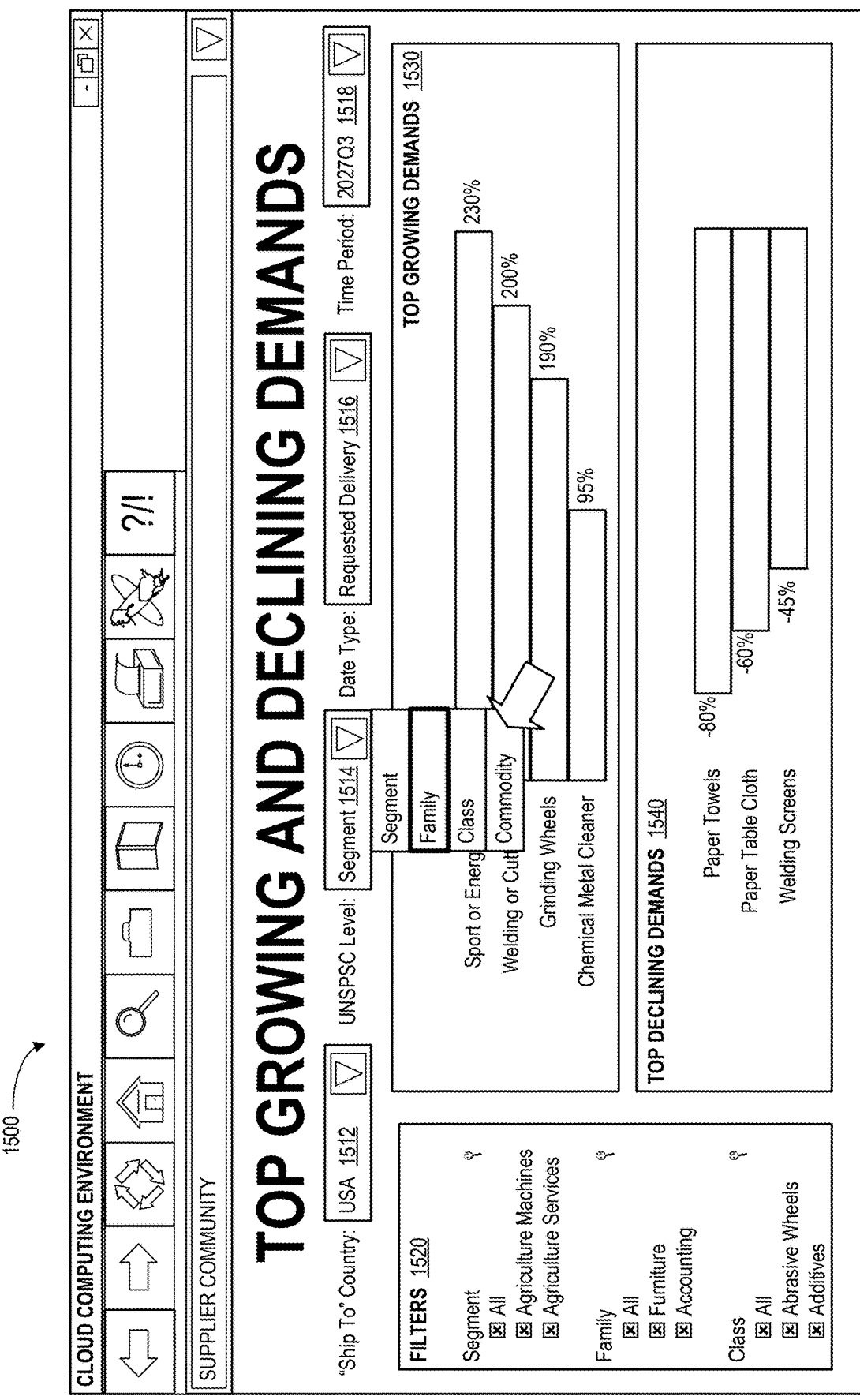
FIG. 15 is a top growing and declining demands display in accordance with some embodiments.
Figure 16:
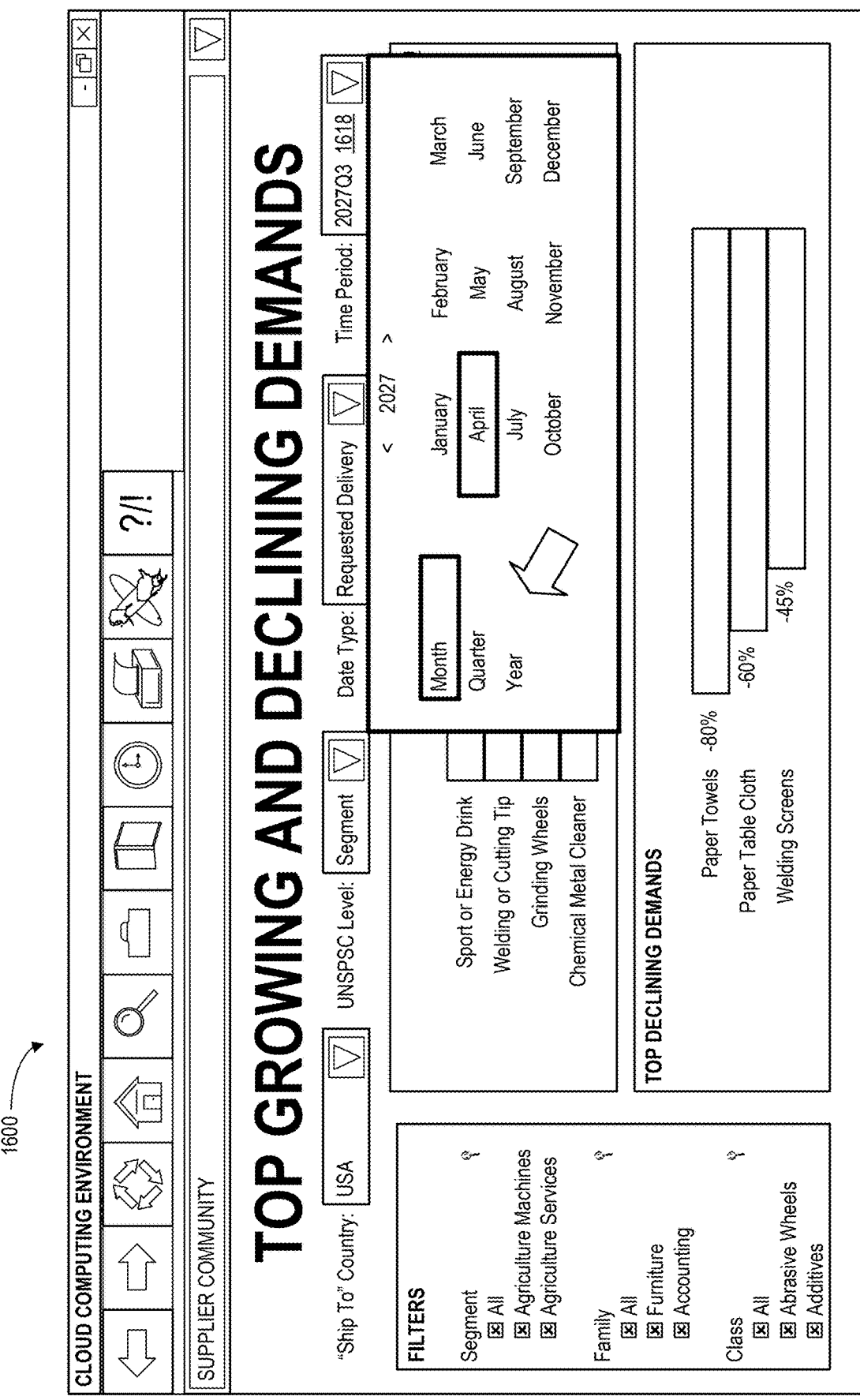
FIG. 16 illustrates analyzer time period selection according to some embodiments.

FIG. 15 is a top growing and declining demands display 1500 in accordance with some embodiments. A "ship-to" country 1512 may let a user provide a region that determines the data that drives the display 1500. A user selectable UNSPSC level 1514 dropdown menu also determines the data that will be used to drive the display 1500 (e.g., information about segments, families, classes, or specific commodities). Similarly, a date type selection 1516 (e.g., purchase orders with a requested delivery date that falls withing a particular time range) and a time period selection 1518 (e.g., a fiscal quarter) may be provided. Filters 1520 may let the user specify various products or services that will drive the display 1500. A list of top growing demands 1530 (by order amount) may provide a numerical and graphical display of the selected information over the time period 1518. Similarly, a list of top declining demands 1540 (by order amount) may provide a numerical and graphical display of the selected information over the time period 1518. The display 1500 may let a seller evaluate top and bottom performing commodities (at either a higher or lower detail depending on the breath of your business or responsibilities), evaluate demand related to a potential acquisition at a high level, evaluate additions or removal to/from a product portfolio at low level, etc. FIG. 16 illustrates 1600 analyzer time period selection 1618 letting the user select, for example, a time period duration and a particular time period of interest (e.g., April 2027) according to some embodiments to evaluate growth of top and bottom commodities for a specific month, quarter, or year.

Figure 17:
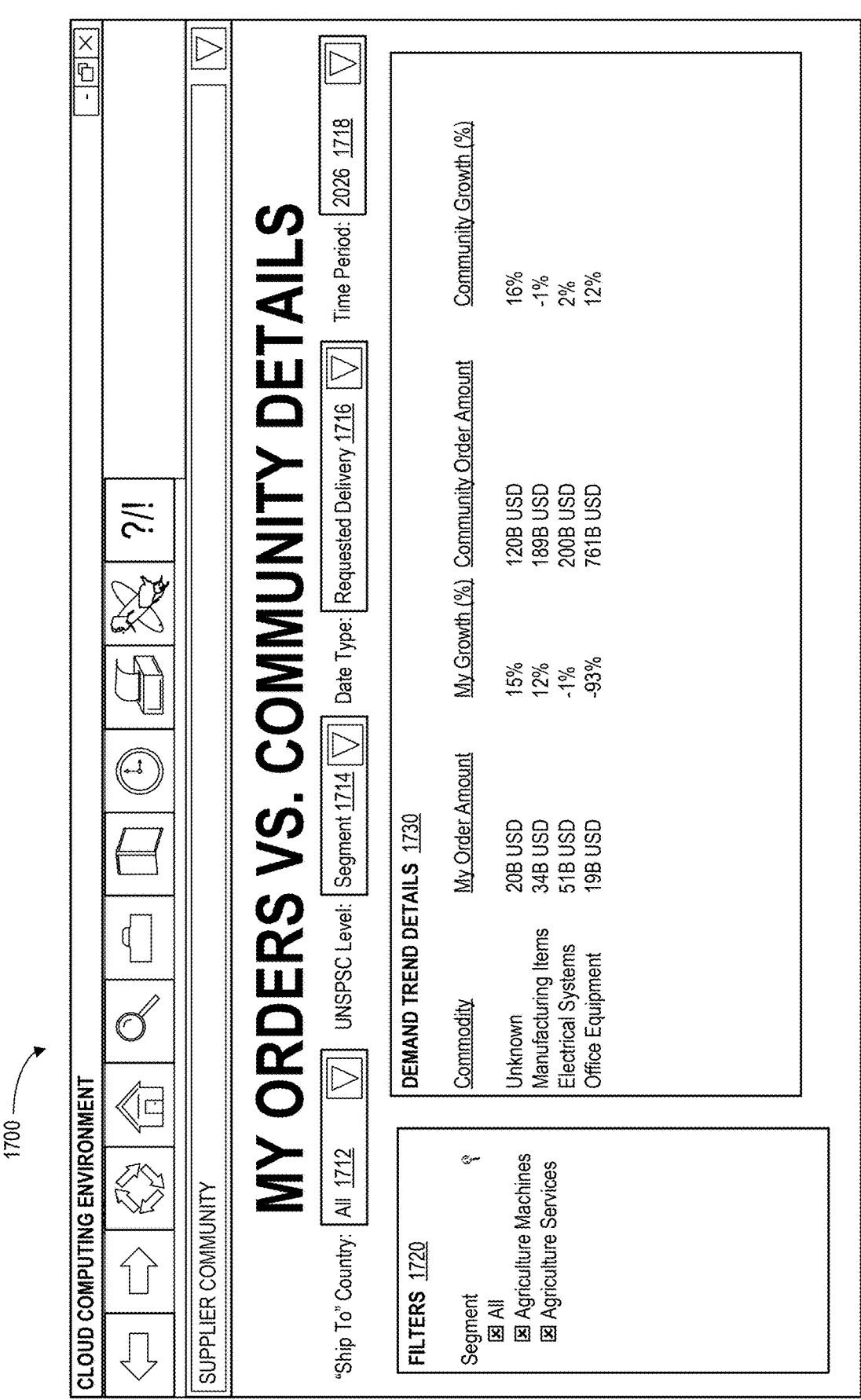
FIG. 17 is a party demand vs. community demand tabular display in accordance with some embodiments.

FIG. 17 is a party (e.g., a seller requesting or initiating the analysis) demand vs. community demand tabular display 1700 in accordance with some embodiments. A "ship-to" country 1712 may let a user provide a region that determines the data that drives the display 1700. A user selectable UNSPSC level dropdown menu 1714, a date type selection 1716, and a time period selection 1718 (e.g., a fiscal quarter) may be provided. Filters 1720 may let the user specify various products or services that will drive the display 1700. Demand trend details 1730 might include a commodity description, a party order amount, a party growth percentage, a community order amount, and a community growth percentage.

Figure 18:
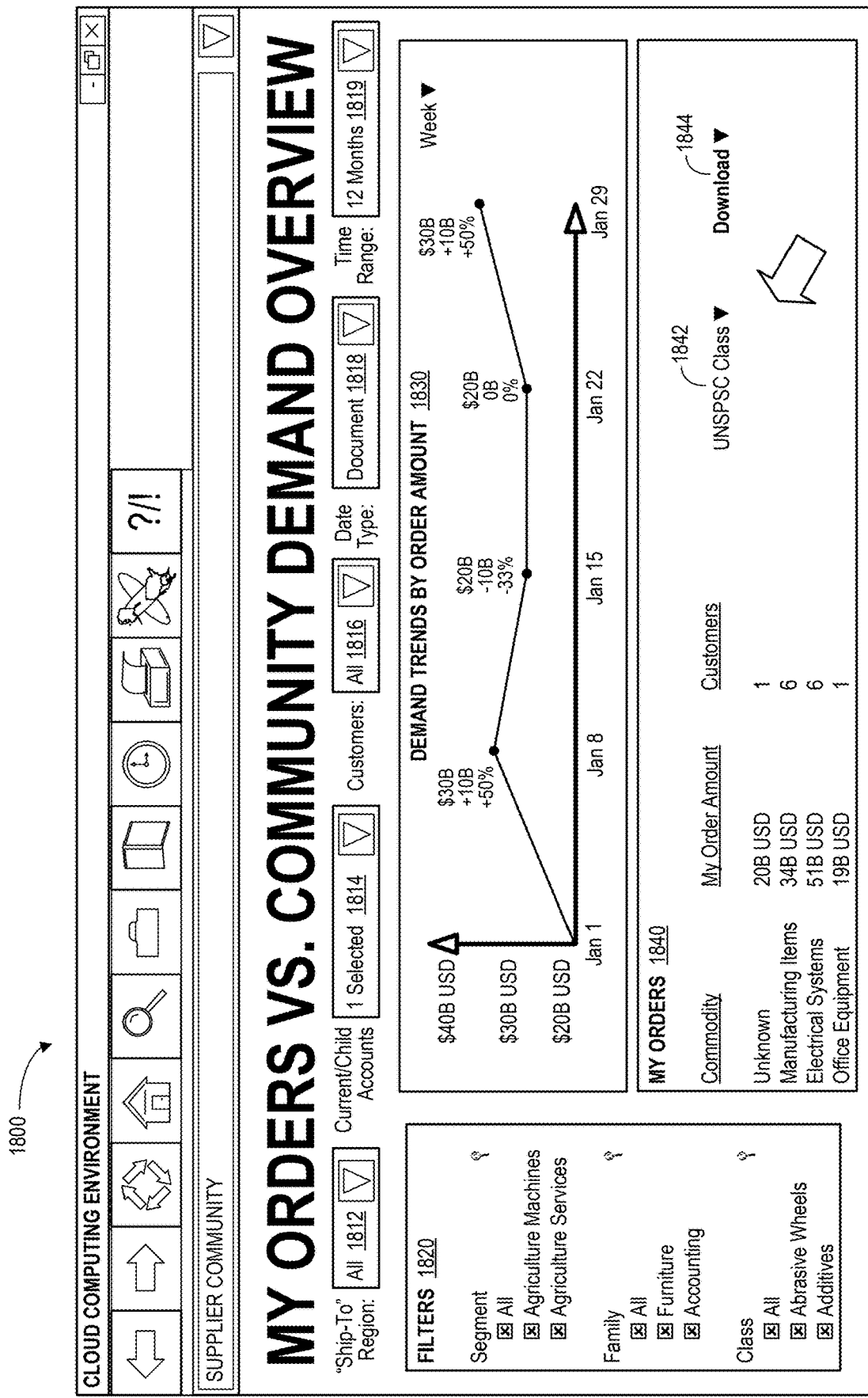
FIG. 18 is a party demand overview display according to some embodiments.

FIG. 18 is a party demand overview display 1800 according to some embodiments. As before, a "ship-to" country 1812 may let a user provide a country that determines the data that drives the display 1800. A user selectable current/child account selection 1814 (where parent accounts may view aggregated data across all child accounts or limit display of data to one or more child accounts), a customer selection 1816, a date type selection 1818, and a time range selection 1819 (e.g., twelve months) may be provided. Filters 1820 may let the user specify various products or services that will drive the display 1800. The display 1800 includes graphical demand trends by order amount 1830 and tabular party-specific demand details 1840 (such as a commodity description, order amounts, a number of customers, etc.). A UNSPSC selection 1842 may control the tabular demand details 1840 and a download option 1844 may let the user download the information (e.g., to a spreadsheet application) to evaluate demand (by amount) over time, analyze commodity performance with historical trend data, spot trends, unexpected spikes, and seasonality in data, avoid having too much nor too little inventory as demand changes.

Figure 19:
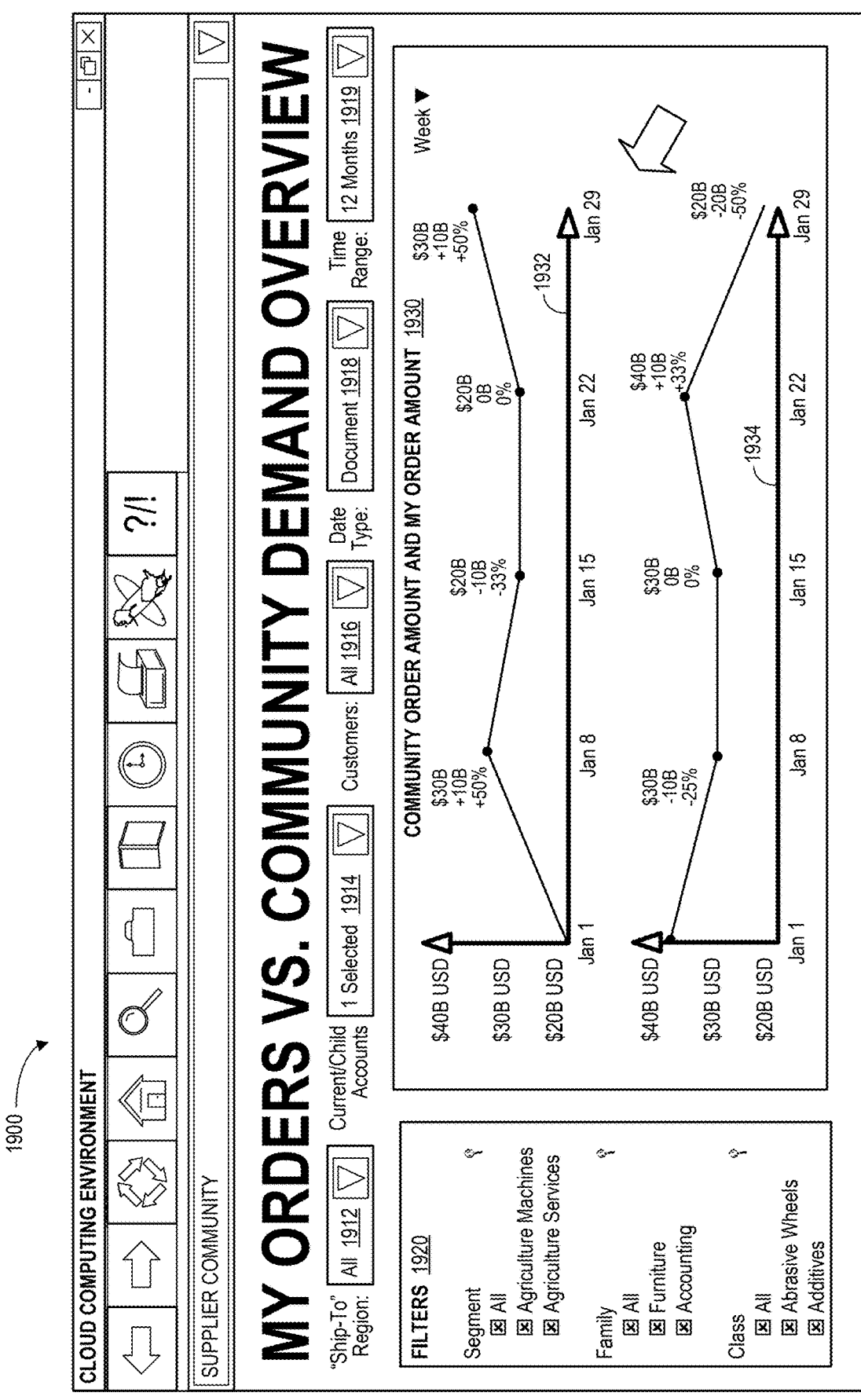
FIG. 19 is a party demand vs. community demand graphical display in accordance with some embodiments.

FIG. 19 is a party demand vs. community demand graphical display 1900 in accordance with some embodiments. Once again, a "ship-to" region 1912 lets a user define a region that determines the data that drives the display 1900. A user selectable current/child account selection 1914, a customer selection 1916, a date type selection 1918, and a time range selection 1919 may be provided. Filters 1920 let the user specify various products or services that will drive the display 1900. The display 1900 includes graphical demand trends by community order amount (e.g., graph 1932) and party order amount (e.g., graph 1934 1930.

Figure 20:
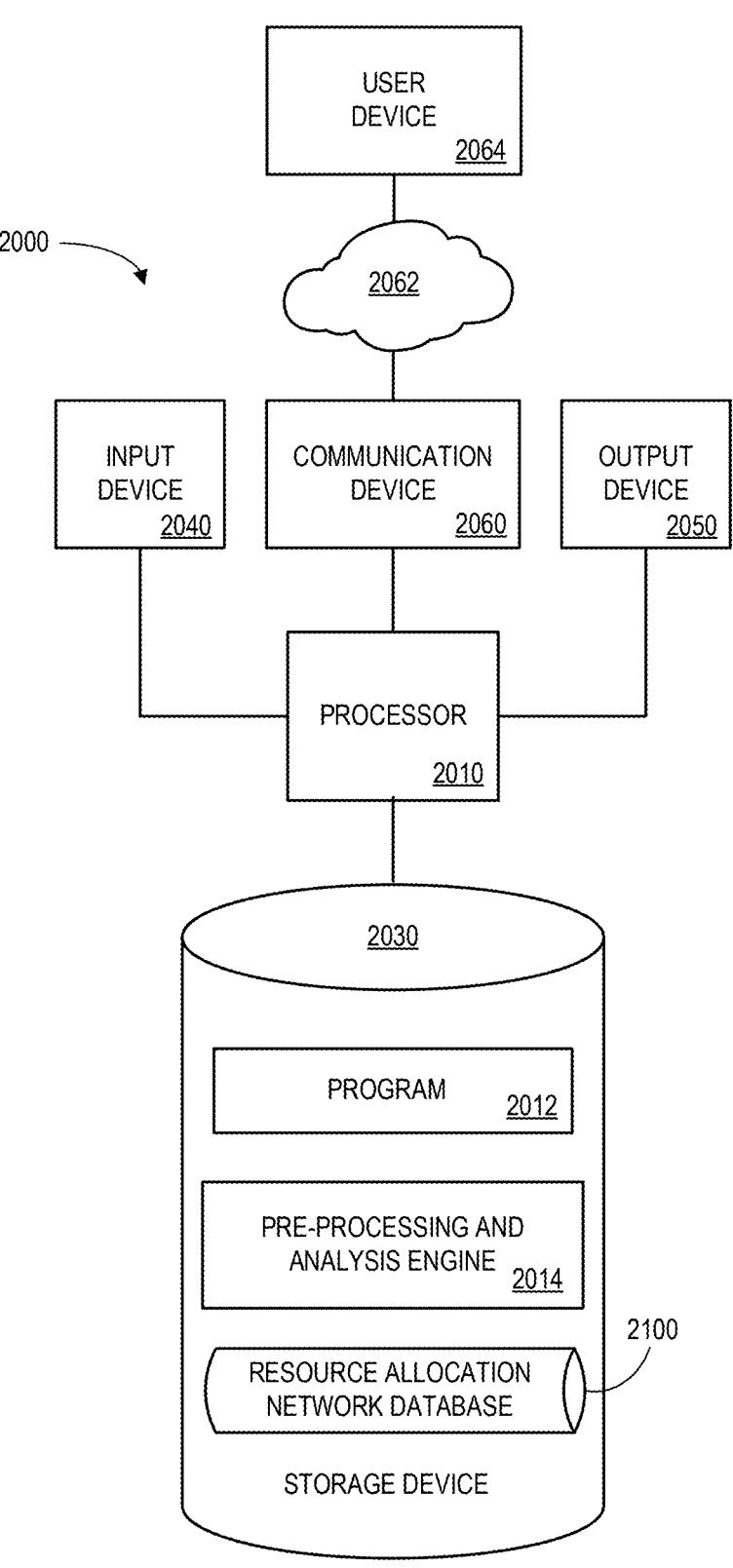
FIG. 20 is an apparatus or platform according to some embodiments.

Note that the embodiments described herein may be implemented using any number of different hardware configurations. For example, FIG. 20 is a block diagram of an apparatus or platform 2000 that may be, for example, associated with the systems 200, 400 of FIGS. 2A and 4A, respectively (and/or any other system described herein). The platform 2000 comprises a processor 2010, such as one or more commercially available Central Processing Units ("CPUs") in the form of one-chip microprocessors, coupled to a communication device 2060 configured to communicate via a communication network 2062. The communication device 2060 may be used to communicate, for example, with one or more user devices 2064 (e.g., seller browser interfaces) via a distributed computer network 2062. The platform 2000 further includes an input device 2040 (e.g., a computer mouse and/or keyboard to input data mappings, cloud configurations, etc.) and/an output device 2050 (e.g., a computer monitor to render a display, transmit recommendations, charts, alerts, and/or reports about a demand trends, etc.).

The processor 2010 also communicates with a storage device 2030. The storage device 2030 may comprise any appropriate information storage device, including combinations of magnetic storage devices (e.g., a hard disk drive), optical storage devices, mobile telephones, and/or semiconductor memory devices. The storage device 2030 stores a program 2012 and/or pre-processing and analysis engine 2014 for controlling the processor 2010. The processor 2010 performs instructions of the programs 2012, 2014, and thereby operates in accordance with any of the embodiments described herein. For example, the processor 2010 may periodically retrieve information from a resource allocation network data store, pre-aggregate the information for multiple combinations of selectable analysis options, and store the pre-aggregated data. The processor 2010 may receive an analysis initiation request (including a plurality of selected analysis options) from a network point (e.g., a seller). The processor 2010 then determines a first value of resource amounts based on the selected analysis options, information in the cache, and allocation amounts for the network point initiating the analysis. The processor 2010 also determines a second value of resource amounts based on allocation amounts for points including points other than the point initiating the analysis (e.g., the whole community. A response, including the first and second values, is provided to the network point that provided the analysis initiation request.

The programs 2012, 2014 may be stored in a compressed, uncompiled and/or encrypted format. The programs 2012, 2014 may furthermore include other program elements, such as an operating system, clipboard application, a database management system, and/or device drivers used by the processor 2010 to interface with peripheral devices.

As used herein, information may be "received" by or "transmitted" to, for example: (i) the platform 2000 from another device; or (ii) a software application or module within the platform 2000 from another software application, module, or any other source.

In some embodiments (such as the one shown in FIG. 20), the storage device 2030 further stores an analysis request database 2100. An example of a database that may be used in connection with the platform 2000 will now be described in detail with respect to FIG. 21. Note that the database described herein is only one example, and additional and/or different information may be stored therein. Moreover, various databases might be split or combined in accordance with any of the embodiments described herein.

Referring to FIG. 21, a table is shown that represents the analysis request database 2100 that may be stored at the platform 2000 according to some embodiments. The table may include, for example, entries identifying request that have been initiated by sellers asking for a demand analysis. The table may also define fields 2102, 2104, 2106, 2108, 2110, 2112 for each of the entries. The fields 2102, 2104, 2106, 2108, 2110, 2112 may, according to some embodiments, specify: an analysis request identifier 2102, an allocation point submitting the request 2104, selected analysis options 2106, a first value 2108, a second value 2110, and a response identifier 2112. The analysis request database 2100 may be created and updated, for example, when a new request is received from a seller.

The analysis request identifier 2102 might be a unique alphanumeric label that is associated with a request for a community demand analysis. The allocation point submitting the request 2104 may indicate the seller who initiated the request. The selected analysis options 2106 may include, for example, a region, time period, and commodities of interest to the seller. The first value 2108 might comprise a demand trends analysis associated with the seller. The second value 2110 might comprise a demand trends analysis associated with an overall community (e.g., including the seller). The response identifier 2112 might identify how and when the analysis transmitted the analysis (including the first value 2108 and the second value 2110).

In this way, embodiments may help a seller uncover high-demand, low-competition categories with high revenue potential. Some embodiments may save and monitor potential category additions so they never miss an opportunity and track categories to evaluate sales over time to spot trends, unexpected spikes, and seasonality. Embodiments may also boost sales by identifying categories with less competition sold within the resource network. Sellers can review current and historical demand by amount and units ordered, optimize price when responding to sourcing opportunities, and/or optimize inventory by identifying category-specific demand spikes and seasonality. Embodiments may help a seller identify new opportunities in adjacent country-specific markets and analyze buying behaviors of customers served by the resource network.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of product and service codes, any of the embodiments described herein could be applied to other types of product and service codes.

Figure 22:
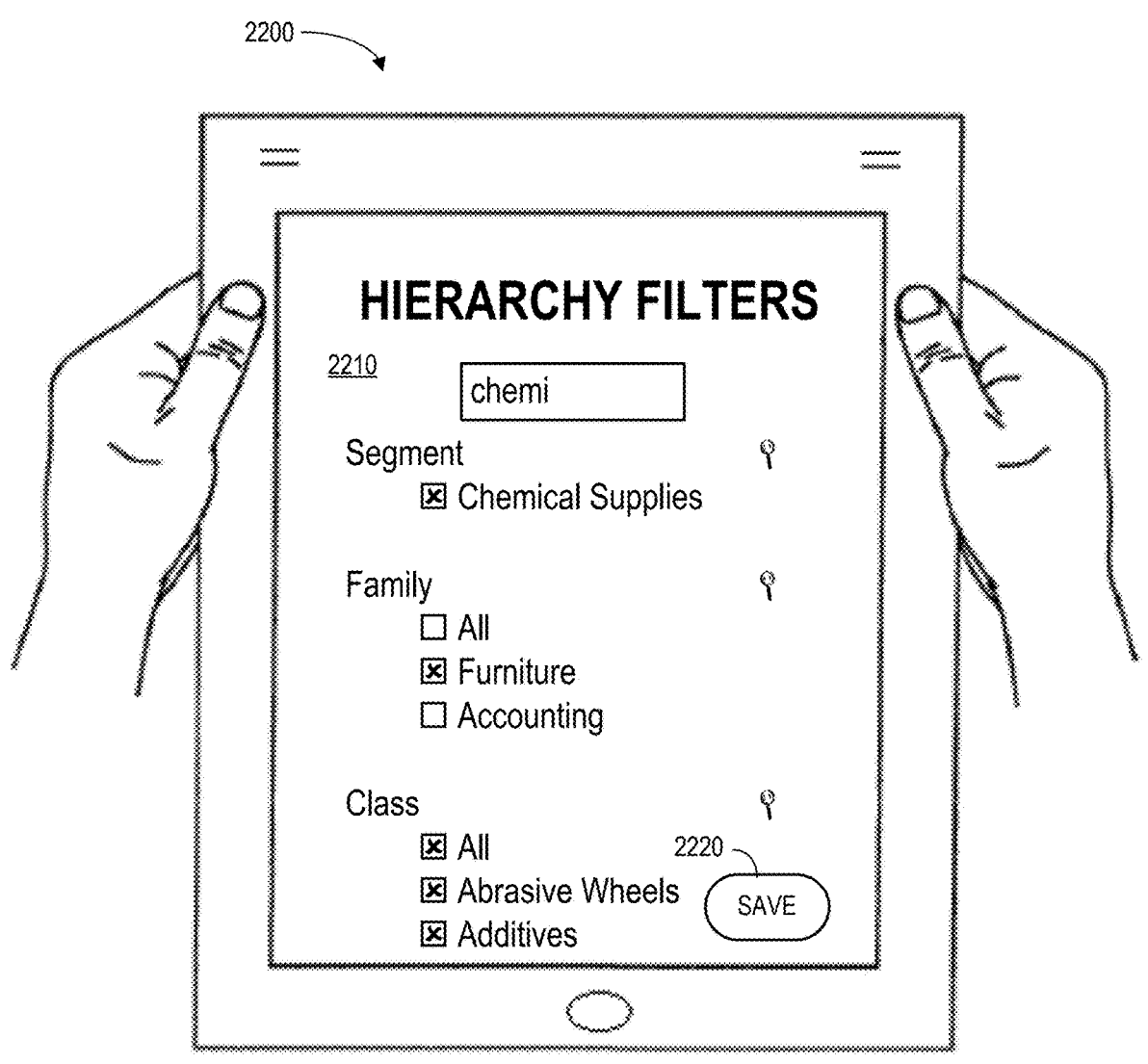
FIG. 22 illustrates a tablet computer hierarchy filter display according to some embodiments.

In addition, the displays shown herein are provided only as examples, and any other type of user interface could be implemented. For example, FIG. 22 illustrates a tablet computer 2200 providing hierarchy filters display 2210 according to some embodiments. The hierarchy display 2210 might be used, for example, by a seller to define a community of buyers and sellers based on a set of commodities. A user may interact with the display 2210, such as by touching an element of the display 2210 and selecting an "Save" icon 2220. In this way, the user may define and submit a demand trends analysis request.

Figure 23:
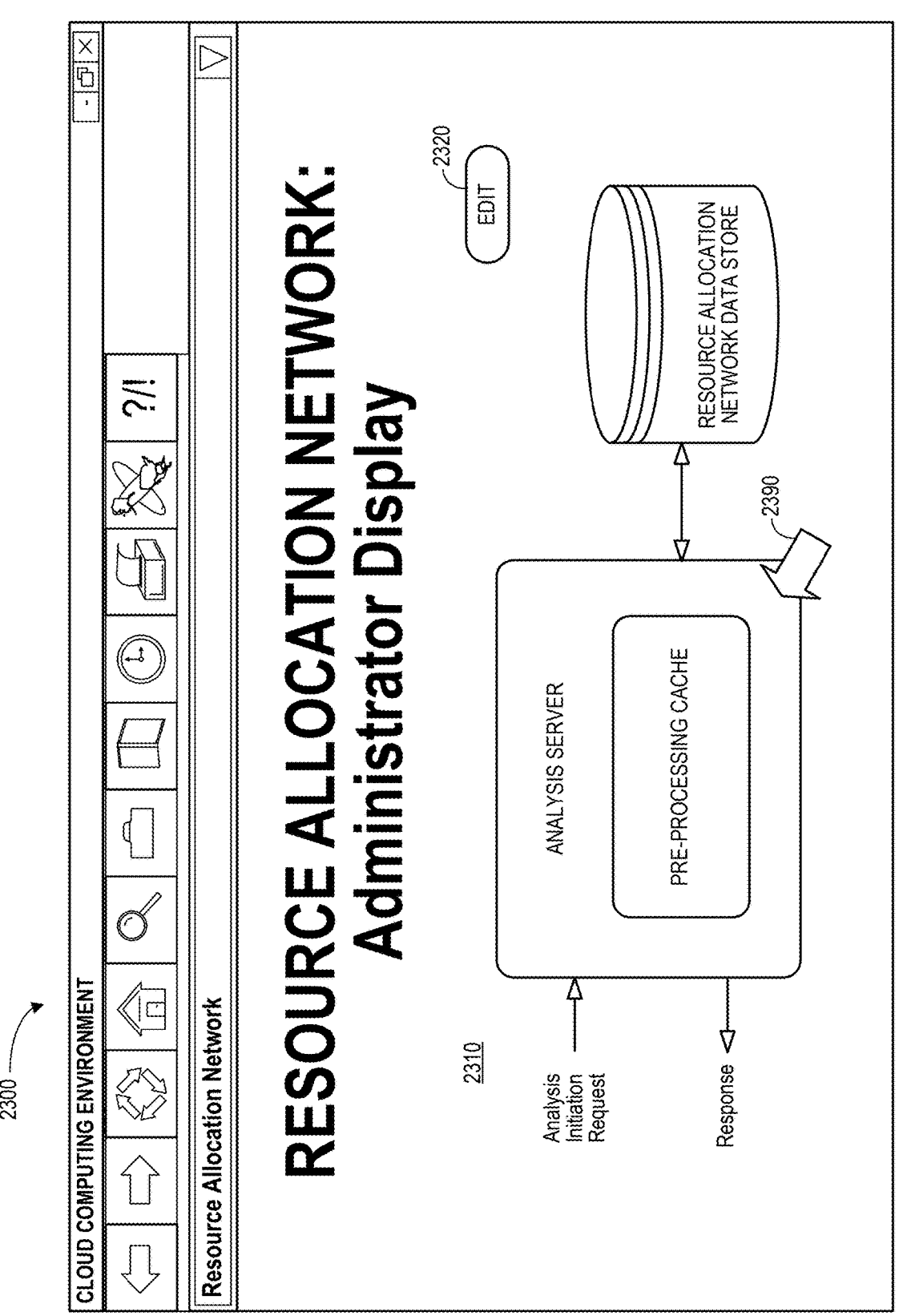
FIG. 23 is a resource allocation network operator or administrator display in accordance with some embodiments.

FIG. 23 is an operator or administrator display 2300 in accordance with some embodiments. The display 2300 includes a graphical representation 2310 of a resource allocation network in accordance with any of the embodiments described herein. Selection of an element on the display 2300 (e.g., via a touchscreen or computer pointer 2390) may result in display of a pop-up window containing more detailed information about that element and/or various options (e.g., to define machine learning logic, prediction quality evaluation thresholds, anonymity rules, etc.). Selection of an "Edit" icon 2320 may also let an operator or administrator adjust the operation of the system (e.g., to change mapping to a data store, adjust cloud implementation properties, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system comprising:
a memory storing processor-executable program code; and
at least one processing unit to execute the processor-executable program code to cause the system to:
periodically retrieve information from a resource allocation network data store that contains information about a plurality of resource allocations, each allocation being associated with a hierarchical resource identifier, a plurality of network points associated with the allocation, and a resource amount, wherein the resource identifier hierarchy has a plurality of levels, each level being associated with a plurality of selectable analysis options,
automatically pre-aggregate the retrieved information for multiple combinations of selectable analysis options, and
store the pre-aggregated data; and
an analysis server comprising a processor, coupled to a pre-processing cache, to:
automatically enrich resource identifiers using a machine learning model,
automatically evaluate a quality of the enriched resource identifiers and store evaluation results in a table schema that includes feature columns, a resource identifier received from a network point, a resource description and a resource identifier quality evaluation, a predicted network resource identifier, and a selected resource identifier for consumption,
receive an analysis initiation request, including a plurality of selected analysis options, from a network point,
determine a first value of resource amounts based on the selected analysis options, information in the pre-processing cache, and allocation amounts for the network point initiating the analysis,
determine a second value of resource amounts based on the selected analysis options, information in the pre-processing cache, and allocation amounts for network points including points other than the point initiating the analysis, and
transmit a response, including the first and second values and a graphical display of an aggregated resource amount trend, to the network point that provided the analysis initiation request.

2. The system of claim 1, wherein the analysis server determines if an anonymous display rule is satisfied for a level of the resource identifier hierarchy and, if the anonymous display rule is not satisfied, automatically cascading information to a higher level in the hierarchy.

3. The system of claim 2, wherein the anonymous display rule is associated with a number of network points for the selected analysis options.

4. The system of claim 2, wherein the anonymous display rule is associated with a network point's percentage of aggregated resource amounts for the selected analysis options.

5. The system of claim 1, wherein a region represented by the graphical display of the aggregated resource amount trend is selectable by a user.

6. The system of claim 1, wherein a time period for the graphical display of the aggregated resource amount trend is selectable by a user.

7. The system of claim 1, wherein the transmitted response further includes a graphical comparison of aggregated resource amounts and resource amounts for the network point that provided the analysis initiation request.

8. A computer-implemented method associated with a resource network in a cloud computing environment, comprising:
periodically retrieving, by a computer processor of a pre-processing cache, information from a resource allocation network data store that contains information about a plurality of resource allocations, wherein each allocation includes a hierarchical resource identifier, a plurality of network points associated with the allocation, and a resource amount, and the resource identifier hierarchy has a plurality of levels, each level being associated with a plurality of selectable analysis options;

automatically pre-aggregating the retrieved information for multiple combinations of selectable analysis options;

storing the pre-aggregated data;

automatically enriching, by an analysis server, resource identifiers using a machine learning model, automatically evaluating, by the analysis server, a quality of the enriched resource identifiers and store evaluation results in a table schema that includes feature columns, a resource identifier received from a network point, a resource description and a resource identifier quality evaluation, a predicted network resource identifier, and a selected resource identifier for consumption;

receiving, by the analysis server, an analysis initiation request, including a plurality of selected analysis options, from a network point;

determining a first value of resource amounts based on the selected analysis options, information in the pre-processing cache, and allocation amounts for the network point initiating the analysis;

determining a second value of resource amounts based on the selected analysis options, information in the pre-processing cache, and allocation amounts for network points including points other than the point initiating the analysis; and transmitting a response, including the first and second values and a graphical display of an aggregated resource amount trend, to the network point that provided the analysis initiation request.

9. The method of claim 8, wherein the analysis server determines if an anonymous display rule is satisfied for a level of the resource identifier hierarchy and, if the anonymous display rule is not satisfied, automatically cascading information to a higher level in the hierarchy.

10. The method of claim 9, wherein the anonymous display rule is associated with a number of network points for the selected analysis options.

11. The method of claim 9, wherein the anonymous display rule is associated with a network point's percentage of aggregated resource amounts for the selected analysis options.

12. The method of claim 9, wherein a region represented by the graphical display of the aggregated resource amount trend is selectable by a user.

13. One or more non-transitory computer-readable media storing computer-executable instructions that, when executed by a computing system, cause the computing system to perform operations for a resource network in a cloud computing environment, comprising:

periodically retrieving, by a computer processor of a pre-processing cache, information from a resource allocation network data store that contains information about a plurality of resource allocations, wherein each allocation includes a hierarchical resource identifier, a plurality of network points associated with the allocation, and a resource amount, and the resource identifier hierarchy has a plurality of levels, each level being associated with a plurality of selectable analysis options;

automatically pre-aggregating the retrieved information for multiple combinations of selectable analysis options;

storing the pre-aggregated data;

automatically enriching, by an analysis server, resource identifiers using a machine learning model, automatically evaluating, by the analysis server, a quality of the enriched resource identifiers and store evaluation results in a table schema that includes feature columns, a resource identifier received from a network point, a resource description and a resource identifier quality evaluation, a predicted network resource identifier, and a selected resource identifier for consumption;

receiving, by the analysis server, an analysis initiation request, including a plurality of selected analysis options, from a network point;

determining a first value of resource amounts based on the selected analysis options, information in the pre-processing cache, and allocation amounts for the network point initiating the analysis;

determining a second value of resource amounts based on the selected analysis options, information in the pre-processing cache, and allocation amounts for network points including points other than the point initiating the analysis; and transmitting a response, including the first and second values and a graphical display of an aggregated resource amount trend, to the network point that provided the analysis initiation request.

14. The media of claim 13, wherein the analysis server determines if an anonymous display rule is satisfied for a level of the resource identifier hierarchy and, if the anonymous display rule is not satisfied, automatically cascading information to a higher level in the hierarchy and the anonymous display rule is associated with both: (i) a number of network points for the selected analysis options, and (ii) a network point's percentage of aggregated resource amounts for the selected analysis options.

15. The media of claim 13, wherein a region represented by the graphical display of the aggregated resource amount trend is selectable by a user.

16. The media of claim 13, wherein a time period for the graphical display of the aggregated resource amount trend is selectable by a user.

17. The media of claim 13, wherein the transmitted response further includes a graphical comparison of aggregated resource amounts and resource amounts for the network point that provided the analysis initiation request.

* * * * *